(12) United States Patent
Kakehashi et al.

(10) Patent No.: US 7,334,430 B2
(45) Date of Patent: Feb. 26, 2008

(54) REFRIGERATING CYCLE

(75) Inventors: Nobuharu Kakehashi, Toyoake (JP); Hiromi Ohta, Okazaki (JP)

(73) Assignee: DENSO Corporation, Kariya (JP)

( * ) Notice: Subject to any disclaimer, the term of this patent is extended or adjusted under 35 U.S.C. 154(b) by 238 days.

(21) Appl. No.: 11/300,171

(22) Filed: Dec. 14, 2005

(65) Prior Publication Data

US 2006/0137388 A1 Jun. 29, 2006

(30) Foreign Application Priority Data

Dec. 24, 2004 (JP) ............................. 2004-372956

(51) Int. Cl.
*F25B 41/00* (2006.01)
(52) U.S. Cl. ......................... 62/513; 62/498
(58) Field of Classification Search .................. 62/498, 62/513, 524, 503
See application file for complete search history.

(56) References Cited

U.S. PATENT DOCUMENTS

| | | | |
|---|---|---|---|
| 6,092,379 A | 7/2000 | Nishida et al. | |
| 6,192,695 B1 * | 2/2001 | Hirota | ........................ 62/196.4 |
| 6,971,246 B2 * | 12/2005 | Kurata et al. | .............. 62/196.4 |

FOREIGN PATENT DOCUMENTS

JP 2000-035250 2/2000

* cited by examiner

*Primary Examiner*—Melvin Jones
(74) *Attorney, Agent, or Firm*—Harness, Dickey & Pierce, PLC

(57) ABSTRACT

A plurality of evaporators 5, 11 for evaporating an refrigerant at low pressure, which has passed through pressure reducing means 4, 10, are provided, an accumulator 9 is provided on the outlet side of one evaporator 5, an internal heat exchanger 3 is provided on the outlet side of the accumulator 9, the outlet side of another evaporator 11 is joined to a portion between the outlet side of the accumulator 9 and the inlet side of the internal heat exchanger 3, and the pressure reducing means 10 at the evaporator 11 side is composed of a fixed throttle.

22 Claims, 23 Drawing Sheets

REFRIGERATING CYCLE

BACKGROUND OF THE INVENTION

1. Field of the Invention

The present invention relates to a refrigerating cycle having a plurality of evaporators. More particularly, the present invention is preferably applied to a supercritical refrigerating cycle in which a refrigerant such as $CO_2$ (carbon dioxide), the pressure of which is not less than the critical pressure (the refrigerant is in the supercritical state), is used.

2. Description of the Related Art

Concerning this type of supercritical refrigerating cycle, it is normal to use a supercritical refrigerating cycle, as shown in FIG. 22, in which a plurality of evaporators 5, 11 are connected in parallel with each other. Concerning this prior art, refer to FIG. 1 of the official gazette of JP-A-2000-35250. According to this prior art, the first pressure reducing device 4 for reducing the pressure of a refrigerant, which flows into the first evaporator 5, which is one of the plurality of evaporators 5, 11, is composed of an electrical valve mechanism, and the temperature of the refrigerant at the outlet of the radiator 2, which is located outside, is detected by the temperature sensor 21 and, further, the pressure of the refrigerant at the outlet of the radiator 2 is detected by the pressure sensor 22.

When the degree of opening of the first pressure reducing device 4 is controlled by a control signal outputted from the control unit 20, the pressure of the refrigerant at the outlet of the radiator 2 is controlled to a target pressure which is determined by the temperature of the refrigerant at the outlet of the radiator, so that the operation efficiency (COP) of the refrigerating cycle can be enhanced. The accumulator 9 is arranged on the outlet side of the first evaporator 5, so that the liquid refrigerant can be prevented from being sucked into the compressor 1 through the passage at the first evaporator 5 side.

On the other hand, the second pressure reducing device, which is arranged in parallel with the first pressure reducing device 4, is composed of a temperature-type expansion valve 100. This temperature-type expansion valve 100 reduces the pressure of the refrigerant flowing into the second evaporator 11. The temperature-type expansion valve 100 has a temperature sensing portion 100a, the inner pressure of which is changed according to the temperature of the refrigerant at the outlet of the second evaporator 11, and conduct control of the degree of superheating of the refrigerant at the outlet of the second evaporator 11. Due to the foregoing, liquid refrigerant can be prevented from being sucked into the compressor 1 through the passage at the second evaporator 11 side.

According to another example described in the above Patent Document, and as shown in FIG. 23, the second pressure reducing device is composed of a fixed throttle 10, and the outlet side of the second evaporator 11 is joined to the outlet side (the suction side of the compressor) of the accumulator 9. Concerning this prior art, refer to FIG. 14 in the official gazette of JP-A-2000-35250.

In this connection, according to the prior art shown in FIG. 22, the following problems may be encountered. As the temperature-type expansion valve 100, which independently conducts control of the degree of superheating of the refrigerant at the outlet of the second evaporator 11 in accordance with a change in the refrigerating load given to the second evaporator 11, is used as the second pressure reducing device, when the refrigerating load given to the second evaporator 11 is increased, the behavior shown in FIG. 24 is caused, and the high pressure control cannot be stably conducted by the first pressure reducing device 4 and hunting is caused in the circuit. As a result, the operation efficiency (COP) of the cycle is deteriorated.

According to the prior art shown in FIG. 22, in the case where a volume of air of the second evaporator 11 is suddenly decreased and the refrigerating load is sharply reduced or in the case where a rotating speed of the compressor 1 is suddenly increased and the low pressure is decreased, the following serious problems are caused. That is, when the low pressure is decreased, as the responding property of the temperature sensing portion 100a is much lower than that of the pressure sensing portion in the temperature-type expansion valve 100, the degree of superheating is increased too much.

Due to the foregoing, in the temperature-type expansion valve 100, the degree of the valve opening is increased to the substantially fully opened state. As a result, almost all the refrigerant circulating in the cycle flows onto the second evaporator 11 side, and the liquid refrigerant is returned at the outlet of the second evaporator 11. On the other hand, at the first evaporator 5 side, a shortage in the flow of the refrigerant is caused. Therefore, the degree of superheating of the refrigerant at the outlet of the first evaporator 5 is excessively increased.

Further, at this time, the temperature-type expansion valve 100 is substantially fully opened, and the high pressure is decreased. Accordingly, a shortage in the flow of the refrigerant at the first evaporator 5 side is further facilitated, and the refrigerating performance of the first evaporator 5 is greatly deteriorated.

In the case where the refrigerating cycle is started from the stop state, when the low pressure is decreased according to the starting operation of the compressor 1, the degree of the valve opening of the temperature-type expansion valve 100 is substantially fully increased in the same manner as that described above, and a shortage in the flow of the refrigerant at the first evaporator 5 side is caused. Accordingly, it is impossible to excellently exhibit the refrigerating performance of the first evaporator 5. As the pressure is not quickly increased, at the time of starting, the entire refrigerating cycle does not function well.

On the contrary, when the low pressure is raised because the refrigerating load is suddenly increased or the rotating speed of the compressor is suddenly decreased, the degree of superheating is too low in the temperature-type expansion valve 100, and the degree of the valve opening is sharply reduced. Therefore, a poor refrigerating performance at the second evaporator 11 is caused.

On the other hand, according to the prior art shown in FIG. 23, as the second pressure reducing device is composed a fixed throttle 10, it is possible to solve the problems caused when the temperature-type expansion valve is used. On the other hand, the following problems, which are different from the problems described above, are caused.

The diameter of the hole of the fixed throttle 10 composing the second pressure reducing device must be determined so that a volume of the refrigerant corresponding to the necessary performance at the time of the maximum refrigerating load of the second evaporator 11 can be made to flow in the hole of the fixed throttle 10. However, when the diameter of the hole of the fixed throttle is set at the diameter necessary at the time of the maximum refrigerating load, when the refrigerating load of the second evaporator 11 is light, that is, when the volume of air is small or the temperature of the sucked air is low, a volume of the refrigerant flowing at the second evaporator 11 side is excessively increased, and the refrigerant at the outlet of the second evaporator 11 contains too much liquid refrigerant.

As a result, the liquid refrigerant is returned to the compressor 1, and an excessively high stress is generated by the compression of liquid, which affects the life of the compressor. Further, as the liquid refrigerant cannot be effectively utilized to exhibit the refrigerating performance of the evaporator, the cycle operation efficiency is deteriorated.

On the contrary, when the diameter of the hole of the fixed throttle is set at a value lower than the diameter necessary at the time of the maximum cooling load, the flow rate of the refrigerant flowing in the second evaporator 11 is low when a heavy load is given to the second evaporator 11, and the degree of superheating of the refrigerant at the outlet of the second evaporator 11 is excessively raised. Accordingly, the refrigerating performance is poor. Further, due to this excessively high degree of superheating, a large temperature variation is generated in the air blown out from the second evaporator 11, white fog is generated in the air blown out from the second evaporator 11 and, further, the air conditioning feeling is deteriorated by the large temperature variation in the vehicle passenger compartment.

SUMMARY OF THE INVENTION

The present invention has been devised in view of the above circumstances. It is an object of the present invention to stably and excellently exhibit the refrigerating performance of a plurality of evaporators in a refrigerating cycle having a plurality of evaporators and also having an accumulator at the outlet side of at least one evaporator.

It is another object of the present invention to stabilize the high pressure control in a refrigerating cycle having a plurality of evaporators and also having a pressure reducing means for controlling at least the high pressure.

It is still another object of the present invention to protect a compressor by positively preventing the liquid from returning to the compressor.

In order to accomplish the above object, according to a first aspect of the present invention, there is provided a refrigerating cycle comprising:

a compressor (1) for sucking and compressing a refrigerant;

a radiator (2) for cooling the refrigerant discharged from the compressor (1);

at least one pressure reducing means (4, 10) for reducing pressure of the refrigerant at the outlet side of the radiator (2);

a plurality of evaporators (5, 11) for evaporating the low pressure refrigerant which has passed through the pressure reducing means (4, 10);

an accumulator (9) provided on the outlet side of one evaporator (5) in the plurality of evaporators (5, 11); and an internal heat exchanger (3) for exchanging heat between the low pressure refrigerant, which flows between the outlet side of the accumulator (9) and the suction side of the compressor (1), and the high pressure refrigerant at the outlet side of the radiator (2), wherein the outlet side of the other evaporator (11) in the plurality of evaporators (5, 11) is joined to a portion between the outlet side of the accumulator (9) and the inlet side of the internal heat exchanger (3), and at least one pressure reducing means reduces the pressure of the refrigerant, which is supplied at least to the other evaporator (11), by a fixed throttle (4, 10).

Due to the foregoing, the pressure of the refrigerant, which is supplied to the other evaporator (11), which is one the plurality of evaporators (5, 11) joined to the outlet side of the accumulator (9), is reduced by the fixed throttle (4, 10). Therefore, unlike the prior art shown in FIG. 22, there is no possibility of the occurrence of hunting of the high pressure control when the degree of superheating of the refrigerant at the outlet of the evaporator is controlled. Accordingly, the cycle operation efficiency (COP) can be enhanced.

In the temperature-type expansion valve, when the low pressure is suddenly decreased, the degree of the valve opening is excessively increased, the flow rate of the refrigerant flowing in one evaporator (5) is low, and, finally, the refrigerating performance is poor. However, according to the present invention, the pressure is reduced by the fixed throttle (4, 10) at the other evaporator (11) side. Therefore, when the low pressure is suddenly reduced, the flow rate of the refrigerant flowing at one evaporator (5) side is not low. Accordingly, it is possible to ensure the refrigerating performance.

In this connection, according to the present invention, the pressure of the refrigerant at the other evaporator (11) side is reduced by the fixed throttle (4, 10) in which the degree of superheating is not controlled. Therefore, when a refrigerating load of the other evaporator (11) is light, the refrigerant at the outlet of the other evaporator (11) contains liquid refrigerant. As the liquid refrigerant at the other evaporator (11) side joins the refrigerant at the outlet of one evaporator (5) side and flows into the internal heat exchanger (3), the liquid refrigerant can be evaporated by the heat exchange with the refrigerant at the high pressure side in the internal heat exchanger (3).

Accordingly, even when the fixed throttle (4, 10) is used, the liquid refrigerant can be positively prevented from returning to the compressor (1), and the durability of the compressor (1) can be increased. Further, the liquid refrigerant can be effectively utilized to increase the amount of heat to be exchanged in the internal heat exchanger (3), and the cycle operation efficiency (COP) can be enhanced.

According to a second aspect of the present invention, in the first aspect of the refrigerating cycle, only one fixed throttle is provided, and pressure of the refrigerant supplied to the plurality of evaporators (5, 11) is reduced by the one fixed throttle.

Due to the foregoing, the pressure of the refrigerant sent to the plurality of evaporators (5, 11) can be reduced only by one fixed throttle, the structure of which is simple. Therefore, the manufacturing cost of the pressure reducing means can be effectively reduced.

According to a third aspect of the present invention, in the first aspect of the refrigerating cycle, a pressure reducing means (4), for reducing pressure of the refrigerant supplied to one evaporator (5); and a fixed throttle (10), for reducing pressure of the refrigerant supplied to the other evaporator (11), can be provided independently from each other.

Due to the foregoing, by the pressure reducing means (4, 10) provided corresponding to each evaporator (5, 11), the flow rate of the refrigerant flowing into each evaporator (5, 11) can be controlled.

According to a fourth aspect of the present invention, a refrigerating cycle comprises:

a compressor (1) for sucking and compressing a refrigerant;

a radiator (2) for cooling the refrigerant discharged from the compressor (1);

at least one pressure reducing means (4, 10) for reducing pressure of the refrigerant at the outlet side of the radiator (2);

a plurality of evaporators (5, 11) for evaporating the low pressure refrigerant which has passed through the pressure reducing means (4, 10);

an accumulator (9) provided on the outlet side of one evaporator (5) in the plurality of evaporators (5, 11); and an internal heat exchanger (3) for exchanging heat between the low pressure refrigerant, which flows between the outlet side of the accumulator (9) and the suction side of the compressor (1), and the high pressure refrigerant at the outlet side of the radiator (2), wherein the outlet side of the other evaporator (11) in the plurality of evaporators (5, 11) is joined to a portion between the outlet side of the accumulator (9) and the inlet side of the internal heat exchanger (3), at least one pressure reducing means reduces the pressure of the refrigerant, which is supplied at least to the other evaporator (11), by a variable throttle (10), and the variable throttle (10) is changed so that the degree of opening can be reduced when the high pressure is lowered.

The fourth aspect of the present invention is different from the first aspect in the point that the pressure of the refrigerant sent to the other evaporator (11) is reduced by the variable throttle (10).

In the fourth aspect, the variable throttle (10) is operated in such a manner that, when the high pressure is decreased, the degree of opening is reduced, and the degree of superheating of the refrigerant at the outlet of the other evaporator (11) is not controlled. Further, when the degree of opening of the variable throttle (10) is decreased, a reduction in the pressure is suppressed. Therefore, in the same manner as that of the first aspect, even when the degree of superheating is controlled, hunting is not caused in the high pressure control. Accordingly, the cycle operation efficiency (COP) can be enhanced.

As the variable throttle (10) of the fourth aspect does not directly respond to only a change in the low pressure, a phenomenon is not caused in which the degree of opening is excessively increased, as with the temperature-type expansion valve, at the time of a sudden reduction in the pressure. Therefore, at the time of the sudden reduction in the pressure, the flow rate of the refrigerant at one evaporator (5) side is not low, and the refrigerating performance of one evaporator (5) can be ensured.

Even when the refrigerant at the outlet of the other evaporator (11) contains liquid refrigerant when the refrigerating load of the other evaporator (11) is low, as the liquid refrigerant at the other evaporator (11) side flows into the internal heat exchanger (3) and evaporates, the liquid refrigerant can be positively prevented from returning back to the compressor (1). Further, the liquid refrigerant can be effectively utilized to increase the amount of heat to be exchanged in the internal heat exchanger (3), and the cycle operation efficiency (COP) can be enhanced.

The variable throttle (10) of the fourth aspect is changed so that the degree of opening can be decreased when the high pressure is reduced. Therefore, when the pressure is raised, the degree of opening of the variable throttle (10) is increased, and the flow rate of the refrigerant flowing to the other evaporator (11) can be increased. When the pressure is raised, the refrigerating load in the entire refrigerating cycle is increased. Therefore, compared with a fixed throttle, this constitution is advantageous in that the flow rate of the refrigerant flowing to the other evaporator (11) can be adjusted according to a change in the load.

According to a fifth aspect of the present invention, in the fourth aspect of the refrigerating cycle, the variable throttle (10) may be, concretely, one of a differential pressure valve, the degree of opening of which is changed according to the differential pressure between the high pressure and the low pressure, a high-pressure responding valve, the degree of valve opening of which is changed according to the high pressure, and the high pressure refrigerant temperature responding valve, the degree of valve opening of which is changed according to a high pressure refrigerant temperature.

According to a sixth aspect of the present invention, in the fourth or fifth aspect of the refrigerating cycle, at least one pressure reducing means including:

a pressure reducing means (4) for reducing the pressure of the refrigerant supplied to one evaporator (5); and a variable throttle (10) for reducing pressure of the refrigerant supplied to the other evaporator (11) can be provided independently of each other.

According to a seventh aspect of the present invention, in the third or sixth aspect of the refrigerating cycle, the pressure reducing means (4) at one evaporator (5) side controls the high pressure according to the high pressure refrigerant temperature at the outlet side of the radiator (2).

Due to the foregoing, the cycle operation efficiency (COP) can be enhanced when the high pressure is controlled by the pressure reducing means (4). Further, even in the cycle in which the high pressure is positively controlled by the pressure reducing means (4), as the pressure reducing means at the other evaporator (11) side is a fixed throttle, which does not conduct the control of the degree of superheating, or a variable throttle, the phenomenon of hunting caused at the high pressure can be positively avoided.

In claim 7, the expression "the high pressure refrigerant temperature at the outlet side of the radiator (2)" includes not only the high pressure refrigerant temperature right after the radiator (2) but also the high pressure refrigerant temperature between the outlet side of the internal heat exchanger (3) and the inlet side of the pressure reducing means (4). Concerning this matter, refer to FIG. 16 described later.

This interpretation of the terminology is the same even in other claims in which the expression "the high pressure refrigerant temperature at the outlet side of the radiator (2)" is employed.

According to an eighth aspect of the present invention, a refrigerating cycle comprises:

a compressor (1) for sucking and compressing a refrigerant;

a radiator (2) for cooling the refrigerant discharged from the compressor (1);

one pressure reducing means (4, 10) for reducing pressure of the refrigerant at the outlet side of the radiator (2);

a plurality of evaporators (5, 11) for evaporating the low pressure refrigerant which has passed through the pressure reducing means (4, 10);

an accumulator (9) provided on the outlet side of one evaporator (5) in the plurality of evaporators (5, 11); and an internal heat exchanger (3) for exchanging heat between the low pressure refrigerant, which flows between the outlet side of the accumulator (9) and the suction side of the compressor (1), and the high pressure refrigerant at the outlet side of the radiator (2), wherein the outlet side of the other evaporator (11) in the plurality of evaporators (5, 11) is joined to a portion between the outlet side of the accumulator (9) and the inlet side of the internal heat exchanger (3), and one pressure reducing means controls the high pressure according to the high pressure refrigerant temperature at the outlet side of the radiator (2).

The eighth aspect of the present invention corresponds to the first or the fourth aspect which is changed in such a manner that the pressure reducing means is composed of one pressure reducing means of the high pressure control type described in the seventh aspect. Therefore, according to the eighth aspect, in the same manner as that of the first and the fourth aspect, the degree of superheating is not controlled by the temperature-type expansion valve. Accordingly, there is no possibility of the occurrence of an unstable cycle behavior caused by this control of the degree of superheating.

As the refrigerant can be positively prevented from returning back to the compressor (1), the durability of the compressor (1) can be increased. Further, the liquid refrigerant at the outlet side of the other evaporator (11) can be effectively utilized to increase the amount of heat exchanged in the internal heat exchanger (3). Therefore, in cooperation with the use of the pressure reducing means of the high pressure control type, the cycle operation efficiency (COP) can be effectively enhanced. Further, as only one pressure reducing means is used, the constitution of the refrigerating cycle can be simplified.

According to a ninth aspect of the present invention, a refrigerating cycle comprises:

a compressor (1) for sucking and compressing a refrigerant;

a radiator (2) for cooling the refrigerant discharged from the compressor (1);

at least one pressure reducing means (4, 10) for reducing the pressure of the refrigerant on the outlet side of the radiator (2);

a plurality of evaporators (5, 11) for evaporating the low pressure refrigerant which has passed through the pressure reducing means (4, 10);

an accumulator (9) provided between the outlet side of the plurality of evaporators (5, 11) and the suction side of the compressor (1), and a refrigerant passage through which the refrigerant flowing out from at least one of the plurality of evaporators (5, 11) is introduced onto the inlet side of the other evaporator.

Due to the foregoing, the refrigerant flowing out from one evaporator can be made to flow into the other evaporator, and the refrigerant passing through the other evaporator can be made to flow into the accumulator (9). Therefore, even in the case where the refrigerant at the outlet of one evaporator contains the liquid refrigerant when the refrigerating load of one evaporator is light, this liquid refrigerant is made to flow into the other evaporator and is effectively utilized to exhibit the refrigerating performance of the other evaporator.

Saturated gas, which has passed through the accumulator (9), can be sucked into the compressor (1). Therefore, even when no internal heat exchanger is provided, the liquid refrigerant can be positively prevented from returning back to the compressor (1). Accordingly, the durability of the compressor (1) can be increased.

According to a tenth aspect of the present invention, in the ninth aspect of the refrigerating cycle, one pressure reducing means (4) reduces the pressure of the refrigerant flowing into the plurality of evaporators (5, 11). Therefore, the manufacturing cost of the pressure reducing means can be effectively reduced.

According to an eleventh aspect of the present invention, in the ninth aspect of the refrigerating cycle, a plurality of pressure reducing means (4, 10) can be provided corresponding to the plurality of evaporators (5, 11).

According to a twelfth aspect of the present invention, in the eleventh aspect of the refrigerating cycle, one pressure reducing means (4) in the plurality of pressure reducing means controls the high pressure according to the high pressure refrigerant temperature at the outlet side of the radiator (2).

Due to the foregoing, the cycle operation efficiency (COP) can be enhanced by the high pressure control conducted by the pressure reducing means (4).

According to a thirteen aspect, in the refrigerating cycle of the twelfth aspect, when the other pressure reducing means (10), which is one of the plurality of pressure reducing means, is composed of a fixed throttle, the manufacturing cost of the pressure reducing means can be decreased. As the fixed throttle means does not control the degree of superheating of the refrigerant at the outlet of the evaporator, the high pressure control can be stabilized.

According to a fourteenth aspect of the present invention, in the twelfth aspect of the refrigerating cycle, the other pressure reducing means in the plurality of pressure reducing means is composed of a variable throttle (10), and the degree of opening of the variable throttle (10) is reduced when the high pressure is lowered.

Due to the foregoing, the same operational effect as that of the variable throttle (10) in the fourth aspect can be exhibited.

According to a fifteenth aspect of the present invention, in the eleventh aspect of the refrigerating cycle, at least one of the plurality of pressure reducing means (4, 10) can be composed of a fixed throttle (10).

According to a sixteenth aspect of the present invention, in the eleventh aspect of the refrigerating cycle, at least one of the plurality of pressure reducing means (4, 10) can be composed of a variable throttle (10), and the degree of opening of the variable throttle is reduced when the high pressure is lowered.

According to a seventeenth aspect of the present invention, in the fourteenth or sixteenth aspect of the refrigerating cycle, the variable throttle (10) can, concretely, be one of a differential pressure valve, the degree of opening of which is changed according to the differential pressure between the high pressure and the low pressure, a high-pressure responding valve, the degree of valve opening of which is changed according to the high pressure, and a high pressure refrigerant temperature responding valve, the degree of valve opening of which is changed according to the high pressure refrigerant temperature.

According to an eighteenth aspect of the present invention, in the any one of the ninth to seventeenth aspect of the refrigerating cycle, the refrigerating cycle can further comprise an internal heat exchanger (3) for exchanging heat between the low pressure refrigerant, which flows between the outlet side of the accumulator (9) and the suction side of the compressor (1), and the high pressure refrigerant at the outlet side of the radiator (2).

Due to the foregoing, the cycle operation efficiency (COP) can be enhanced by the internal heat exchanger (3).

According to a nineteenth aspect of the present invention, when the opening and closing valve (16) is provided which stops a flow of the refrigerant to at least one evaporator in the plurality of evaporators (5, 11) in one of the first to the eighteenth aspect of the refrigerating cycle, a flow of the refrigerant to one evaporator can be interrupted according to the need of the refrigerating operation.

According to a twentieth aspect of the present invention, when the changeover valve (17) for changing over a flow of the refrigerant to the plurality of evaporators (5, 11) is provided in one of the first to the eighteenth aspect of the refrigerating cycle, the flow of the refrigerant to the plurality of evaporators can be interrupted according to the necessity of the refrigerating action.

According to a twenty-first aspect of the present invention, in the any one of the first to twentieth aspect of the refrigerating cycle, the refrigerating cycle is a supercritical refrigerating cycle using a refrigerant, the pressure of which is not less than the critical pressure.

In this connection, in the supercritical refrigerating cycle, the refrigerant at a high pressure is not condensed. Therefore, the high pressure fluctuates more than in a subcritical refrigerating cycle in which the usual chlorofluorocarbons refrigerant is used. In the supercritical refrigerating cycle characterized as described above, the present invention employs the pressure reducing means, which is different from the temperature expansion valve, having no function of controlling the degree of superheating. Accordingly, this constitution can contribute to the stabilization of the high pressure.

According to a twenty-second aspect of the present invention, an air conditioner for vehicle use comprising any one of the first to twenty-first aspect of the refrigerating cycles, one evaporator (5) in the plurality of evaporators (5, 11) is arranged in the air conditioning unit (6) on the front seat side in the vehicle passenger compartment, and the other evaporator (11) in the plurality of evaporators (5, 11) is arranged in the air conditioning unit (12) on the rear seat side in the vehicle passenger compartment.

As described above, the present invention can be preferably applied to a dual air conditioner for vehicle use having the front seat side air conditioning unit (6) and the rear seat side air conditioning unit (12).

Incidentally, the reference numerals in parentheses, to denote the above means, are intended to show the relationship of the specific means which will be described later in an embodiment of the invention.

The present invention may be more fully understood from the description of preferred embodiments of the invention set forth below, together with the accompanying drawings.

DESCRIPTION OF THE PREFERRED EMBODIMENTS

Figure 1:
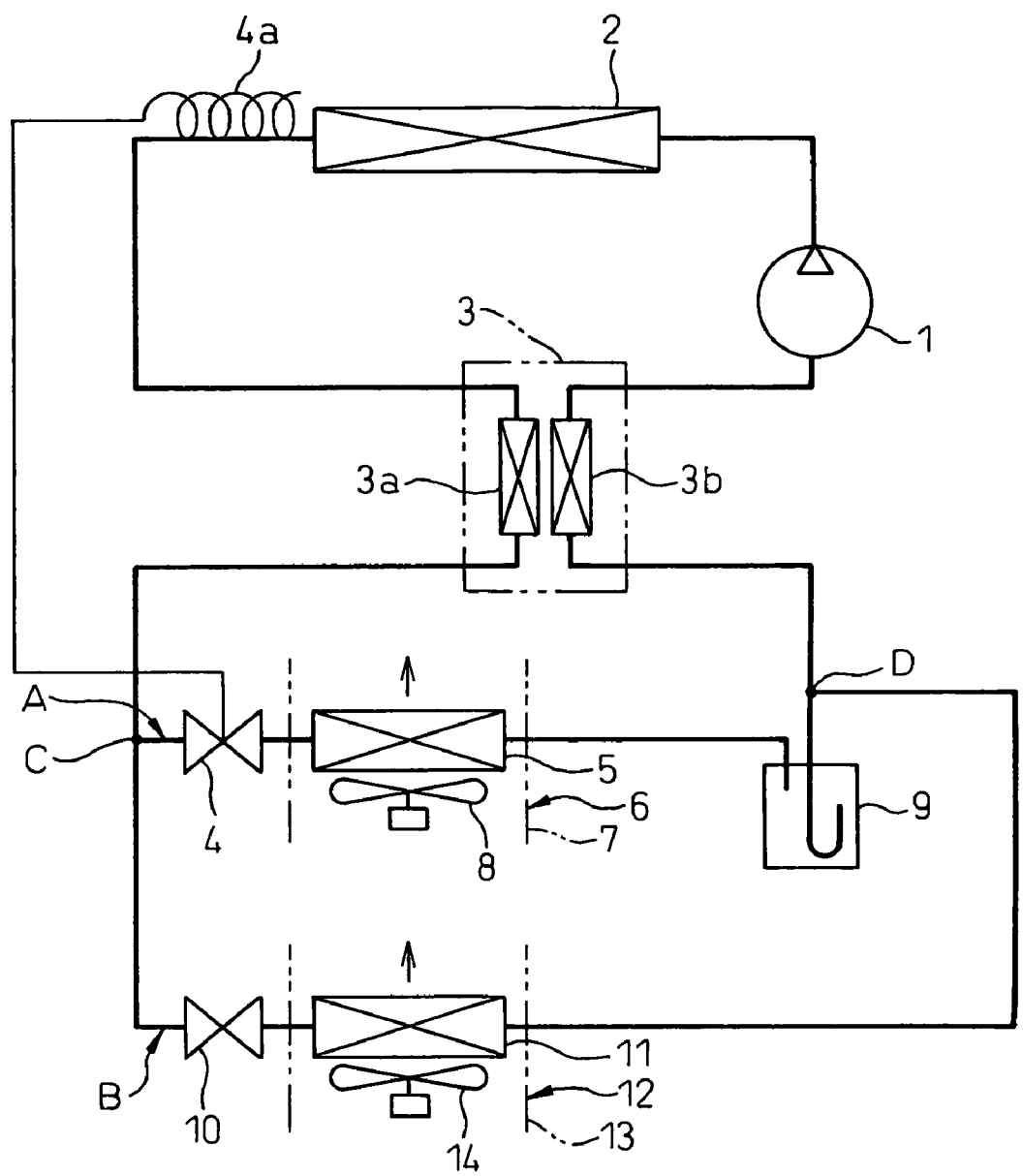
FIG. 1 is an arrangement view showing a refrigerating cycle of the first embodiment of the present invention.

First of all, the first embodiment will be explained below. FIG. 1 is an arrangement view showing a refrigerating cycle used for an air conditioner for vehicle use of the first embodiment of the present invention. In this refrigerating cycle, the refrigerant of $CO_2$ is used, the pressure of which is not less than the critical pressure, that is, the refrigerant is in the supercritical state. Accordingly, this refrigerating cycle composes a supercritical refrigerating cycle.

The compressor 1 is driven by an engine for vehicle use, which is not shown in the drawing, via an electromagnetic clutch (not shown) and sucks and compresses the refrigerant. In this connection, the compressor 1 may be any of the fixed capacity type compressor, which is rotated and stopped by the intermittent action of the electromagnetic clutch, and the variable capacity type compressor, the discharging capacity of which can be changed.

The radiator 2, which is located outside, is provided on the discharging side of the compressor 1. This radiator 2 exchanges heat between the discharged refrigerant, which is discharged from the compressor 1 and put into the supercritical state of high temperature and pressure, and the outside air (the air outside a vehicle passenger compartment), so that the refrigerant can be cooled. A flow of the outside air is sent to the radiator 2 by an electric type cooling fan not shown.

On the outlet side of the radiator 2, the high pressure side refrigerant passage 3a of the internal heat exchanger 3 is provided. Heat is exchanged between the refrigerant at high temperature and pressure flowing in the high pressure side refrigerant passage 3a of the internal heat exchanger 3 and the refrigerant at low temperature and pressure flowing in the low pressure side refrigerant passage 3b.

When heat is exchanged in this way, enthalpy of the refrigerant flowing into the evaporator 5, 11 (described later) is decreased, so that a difference of enthalpy (a refrigerating capacity) between the refrigerant at the inlet and the refrigerant at the outlet of the evaporator 5, 11 can be increased. When the internal heat exchanger 3 is arranged in this way, the difference of enthalpy (a refrigerating capacity) between the refrigerant at the inlet and the refrigerant at the outlet of the evaporator 5, 11 can be increased, and the cycle operation efficiency (COP) can be enhanced.

On the outlet side of the high pressure side refrigerant passage 3a of the internal heat exchanger 3, the first refrigerant passage A and the second refrigerant passage B are arranged in parallel with each other. Reference sign C is a branch point of both passages A and B, and reference sign D is a confluence point of both passages A and B. In this connection, in this embodiment, the first refrigerant passage A composes a refrigerant passage used for air conditioning at the front seat side, and the second refrigerant passage B composes a refrigerant passage used for air conditioning at the rear seat side.

In the first refrigerant passage A, the first pressure reducing device 4 is provided which fulfills a function of the pressure control valve for controlling the high pressure. In this first pressure reducing device 4, the degree of opening is adjusted by a mechanical adjusting mechanism so that the high pressure of the cycle can be a target high pressure.

This first pressure reducing device 4 has a temperature sensing portion 4a provided between the outlet side of the radiator 2 and the inlet side of the high pressure side refrigerant passage 3a of the internal heat exchanger 3. Inside this temperature sensing portion 4a, pressure corresponding to the temperature of the high pressure refrigerant on the outlet side of the radiator 2 is generated.

When the degree of the throttling opening (the degree of the valve body opening) of the first pressure reducing device 4 is adjusted by a balance between the inner pressure of the temperature sensing portion 4a and the high pressure (Specifically, this high pressure is the refrigerant pressure at the outlet side of the high pressure side refrigerant passage of the internal heat exchanger 3), the high pressure is adjusted at a target high pressure determined by the high pressure refrigerant temperature at the outlet side of the radiator 2. The pressure reducing device 4 having the aforementioned high pressure control function is disclosed in the official gazette of JP-A-2000-81157.

The first evaporator 5 is arranged on the outlet side of the first pressure reducing device 4 in the first refrigerant passage A. This first evaporator 5 is arranged in the case 7 forming an air passage of the air conditioning unit 6 on the front seat side of the air conditioner for vehicle use. This first evaporator 5 composes a cooling means for cooling the air in this case 7. The front seat side air conditioning unit 6 is usually arranged in a space formed inside the instrument panel provided in the front portion of the vehicle passenger compartment. The electrical type blower 8 is arranged on the upstream side of the air flow of the first evaporator 5. The inside air or outside air, which has been introduced via an inside and outside air changeover box, is blown into the case 7.

A heater core (not shown) composing a heating means for heating air is arranged on the downstream side of the air flow of the first evaporator 5 in the case 7. A flow of the conditioned air, the temperature of which has been adjusted by this heater core, is blown out from a blowout hole (not shown) of the end portion on the downstream side of the air flow in the case 7 into the front seat region in the vehicle passenger compartment.

The accumulator 9 is provided on the outlet side of the first evaporator 5. This accumulator 9 is a gas-liquid separation means for separating the liquid refrigerant and the gas refrigerant, which are contained in the refrigerant at the outlet of the first evaporator 5, from each other, and for accumulating the redundant refrigerant in the refrigerating cycle. The outlet side of the accumulator 9 is connected to the inlet side of the low pressure side refrigerant passage 3b of the internal heat exchanger 3. The outlet side of the low pressure side refrigerant passage 3b of the internal heat exchanger 3 is connected to the suction side of the compressor 1.

On the other hand, the second pressure reducing device 10 and the second evaporator 11 are connected in parallel with each other on the second refrigerant passage B. This second pressure reducing device 10 is composed of a fixed throttle, the throttle opening degree of which is constant. Specifically, this fixed throttle is composed of an orifice or a capillary tube.

The outlet side of the second evaporator 11 is joined to a portion between the outlet side of the accumulator 9 and the inlet side of the low pressure side refrigerant passage 3b of the internal heat exchanger 3. Accordingly, after the outlet refrigerant of the accumulator 9 and the outlet refrigerant of the second evaporator 11 have been joined to each other, the refrigerant flows into the low pressure side refrigerant passage 3b of the internal heat exchanger 3.

The second evaporator 11 is arranged in the case 13, which composes an air passage of the rear seat side vehicle passenger compartment air conditioning unit 12 of the air conditioner for vehicle use, and composes a cooling means for cooling the air in this case 13. The rear seat side interior air conditioning unit 12 is arranged in a region on the rear seat side in the vehicle passenger compartment. For example, the rear seat side interior air conditioning unit 12 is arranged in the vehicle body side plate portion on the rear seat side. On the upstream side of the air flow of the second evaporator 11, the electrical blower 14 is arranged, and the inside air (the air in the vehicle passenger compartment) is sent into the case 13.

A flow of cold air cooled by the second evaporator 11 is blown out into the rear seat side region in the vehicle passenger compartment from a blowout hole (not shown) provided in the downstream side end portion of the air flow in the case 13. In this connection, a heater core may be arranged in the rear seat side interior air conditioning unit 12 in the same manner as that of the front seat side interior air conditioning unit 6.

Next, the operation of this embodiment composed as described above will be explained below. When the compressor 1 is driven and rotated by a vehicle engine, the refrigerant ($CO_2$) of high temperature and pressure, which has been compressed by the compressor 1, flows into the radiator 2 under the condition of the supercritical state, the pressure of which is higher than the critical pressure. In this radiator 2, heat is exchanged between the refrigerant, which is in the supercritical state of high temperature and pressure, and the outside air. Therefore, heat is radiated into the outside air and enthalpy is decreased.

The refrigerant at high pressure flows from the outlet of the radiator 2 into the high pressure side passage 3a of the internal heat exchanger 3. In the internal heat exchanger 3, heat is exchanged between the refrigerant at high pressure and the refrigerant at low pressure (the refrigerant on the outlet side of the accumulator 9) passing through the low pressure side passage 3b, so that the refrigerant at high pressure can be cooled. Accordingly, enthalpy is further decreased.

The refrigerant at high pressure, which has passed through the high pressure side passage 3a of the internal heat exchanger 3, flows into the first refrigerant passage A and the second refrigerant passage B connected in parallel with each other. Therefore, the pressure of the refrigerant at high pressure is reduced by the first pressure reducing device 4 and the second pressure reducing device 10. In the first evaporator 5, the refrigerant at low pressure, which has passed through the first pressure reducing device 4, absorbs heat from the air blown by the electrical blower 8 and this refrigerant evaporates. Due to the foregoing, a flow of air sent from the electrical blower 8 can be cooled, and the thus cooled air blows out onto the front seat side in the vehicle passenger compartment. In this way, the front seat side in the vehicle passenger compartment is cooled.

At the same time, in the second evaporator 11, the refrigerant at low pressure, which has passed through the second pressure reducing device 10, absorbs heat from the air blown by the electrical blower 14 and evaporates. Due to the foregoing, a flow of air sent from the electrical blower 14 can be cooled, and the thus cooled air blows out onto the rear seat side in the vehicle passenger compartment. In this way, the rear seat side in the vehicle passenger compartment is cooled.

In this case, the degree of the throttle opening of the first pressure reducing device 4 is adjusted so that the actual high pressure can be a target high pressure determined by the temperature of the refrigerant on the outlet side of the radiator which is sensed by the temperature sensing portion 4a. That is, when the actual high pressure is decreased to be lower than the target high pressure, the degree of the throttle opening of the first pressure reducing device 4 is decreased. On the contrary, when the actual high pressure is increased to be higher than the target high pressure, the degree of the throttle opening of the first pressure reducing device 4 is increased. When the degree of the throttle opening of the first pressure reducing device 4 is adjusted as described above, the actual high pressure can be maintained at the target high pressure, and the operation efficiency (COP) of the cycle is enhanced.

Especially, in this embodiment, as the second pressure reducing device 10 is composed of only a fixed throttle, even when the cycle operating condition fluctuates, the degree of opening of the second pressure reducing device 10 is not changed. Therefore, the high pressure can be stably controlled only by the first pressure reducing device 4.

In this connection, as the second pressure reducing device 10 is composed of a fixed throttle, no function of controlling a phase state of the outlet refrigerant of the second evaporator 11 is provided. Therefore, according to the change in the refrigerating load of the second evaporator 11, the outlet refrigerant of the second evaporator 11 is put into a state of superheating. Alternatively, the outlet refrigerant of the second evaporator 11 is put into a state of wet steam, the dryness of which is predetermined.

Accordingly, the following problems may be encountered. If the outlet refrigerant of the second evaporator 11 is joined onto the inlet side of the accumulator 9, in the case where the outlet refrigerant of the second evaporator 11 is in the state of superheating, the outlet refrigerant of the first evaporator 5 is balanced in the state of wet steam, the dryness of which is predetermined, so that the degree of superheating of the outlet refrigerant of the second evaporator 11 can be canceled. Therefore, a difference in enthalpy between the inlet and the outlet of the first evaporator 5 is reduced and the refrigerating capacity of the first evaporator 5 is deteriorated.

However, in this embodiment, the outlet side of the second evaporator 11 is joined to a portion between the outlet side of the accumulator 9 and the inlet side of the lower pressure side refrigerant passage 3b of the internal heat exchanger 3. Therefore, without being affected by the phase state of the outlet refrigerant of the second evaporator 11, the state of the outlet refrigerant of the first evaporator 5 is always maintained in a state close to the saturated gas, the dryness of which is 1, by the existence of a gas-liquid interface in the accumulator 9. Due to the foregoing, the refrigerating performance of the first evaporator 5 can be stably ensured.

In this connection, the first evaporator 5 is a primary cooling means for cooling the front seat side region in the vehicle passenger compartment. On the other hand, the second evaporator 11 is a subsidiary cooling means for cooling the rear seat side region in the vehicle passenger compartment. Accordingly, the necessary cooling performance of the first evaporator 5 is higher than the necessary cooling performance of the second evaporator 11. Therefore, it is necessary to preferentially ensure the cooling performance of the first evaporator 5 to the cooling performance of the second evaporator 11. From this viewpoint, the above effect, in which the cooling performance of the first evaporator 5 can be ensured, is very useful when the present invention is put into practical use.

After the outlet refrigerant of the second evaporator 11 has joined to the outlet refrigerant (saturated gas) of the accumulator 9, it flows into the low pressure side refrigerant passage 3b of the internal heat exchanger 3. Therefore, even when the outlet refrigerant of the second evaporator 11 is put into a state of wet steam, the dryness of which is predetermined, at the time of a light load of the second evaporator 11, the liquid phase refrigerant in a state of this wet steam can be effectively used for cooling the high pressure refrigerant in the internal heat exchanger 3.

That is, when the liquid phase refrigerant contained in the outlet refrigerant of the second evaporator 11 is evaporated in the internal heat exchanger 3, the high pressure refrigerant can be further cooled. Due to the foregoing, enthalpy of the high pressure refrigerant is further decreased and the refrigerating capacities of both the evaporators 5, 11 can be enhanced. At the same time, as the liquid refrigerant can be prevented from returning back to the compressor 1, it is possible to avoid a case in which the liquid refrigerant is compressed by the compressor 1. Therefore, the compressor 1 can be protected.

Figure 2:
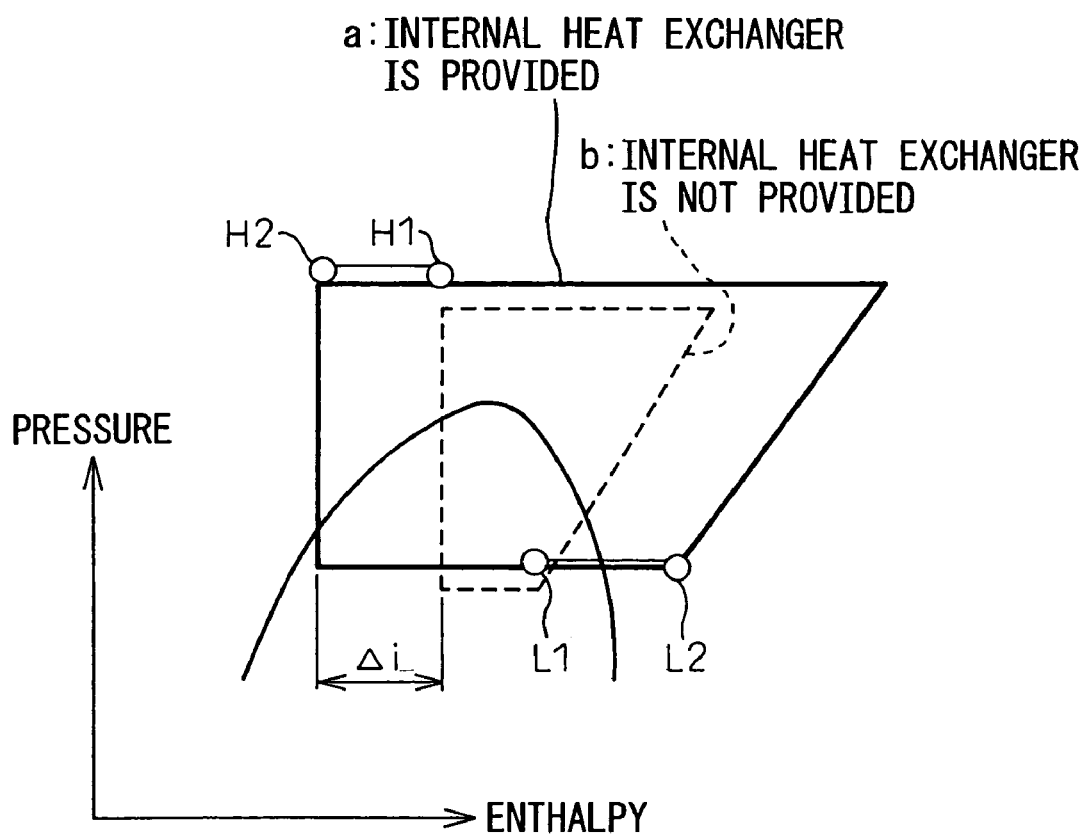
FIG. 2 is Mollier chart for explaining the effect of the internal heat exchanger shown in FIG. 1.

FIG. 2 is Mollier Chart showing the effect of the present embodiment. Solid line "a" shows a state of the refrigerant in the refrigerating cycle in which the internal heat exchanger is provided. Broken line "b" shows a state of the refrigerant in the refrigerating cycle in which the internal heat exchanger is not provided.

In the diagram shown in FIG. 2, L1 shows a state of the inlet refrigerant of the low pressure side refrigerant passage 3b of the internal heat exchanger 3, that is, L1 shows a state of the refrigerant after the outlet refrigerant (saturated gas) of the accumulator 9 and the outlet refrigerant (wet steam of predetermined dryness) of the second evaporator 11 are joined to each other. L2 shows a state of the outlet refrigerant of the low pressure side refrigerant passage 3b of the internal heat exchanger 3. H1 shows a state of the inlet refrigerant (the outlet refrigerant of the radiator 2) of the high pressure side refrigerant passage 3a of the internal heat exchanger 3. H2 shows a state of the outlet refrigerant of the high pressure side refrigerant passage 3a of the internal heat exchanger 3.

As can be understood from FIG. 2, when heat exchange is conducted in the internal heat exchanger 3, enthalpy of the high pressure refrigerant is decreased by Δi, and the cooling capacity corresponding to this decrease Δi can be enhanced. Further, even when the input refrigerant of the low pressure side refrigerant passage 3b of the internal heat exchanger 3 is in a state of wet steam containing the liquid phase refrigerant, the outlet refrigerant is put into a state of superheating. Therefore, the liquid refrigerant can be positively prevented from returning back to the compressor 1.

In this connection, in this embodiment, it is preferable that the degree of the throttle opening (the throttle diameter) of the fixed throttle composing the second pressure reducing device 10 is set at a value which can satisfy the necessary refrigerant flow rate at the time of the maximum cooling load under the normal operating condition of the second evaporator 11.

Figure 3:
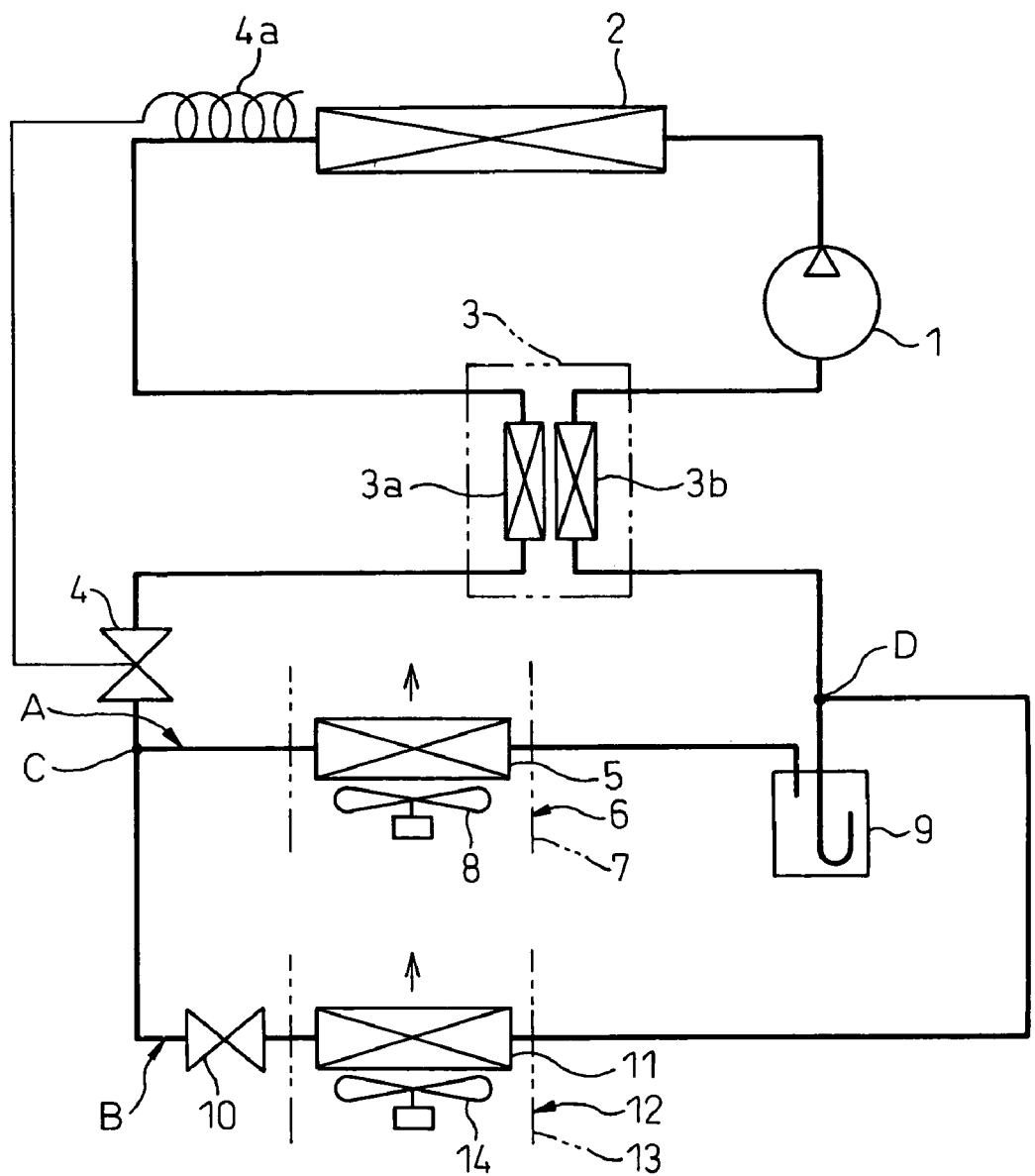
FIG. 3 is an arrangement view showing a refrigerating cycle of the second embodiment of the present invention.

Next, the second embodiment will be explained below. FIG. 3 is a view showing the second embodiment. In this second embodiment, the first pressure reducing device 4 of the first embodiment is arranged on the upstream side of the branch point C of the first refrigerant passage A and the second refrigerant passage B.

Due to the above structure, the first pressure reducing device 4 fulfills a function of reducing the pressure of the refrigerant flowing into both the first refrigerant passage A and the second refrigerant passage B. As a result, the second pressure reducing passage 10 is arranged in the passage of the low pressure refrigerant which has passed through the first pressure reducing device 4. Accordingly, the degree of the throttle opening of the second pressure reducing device 10 may be sufficiently larger than that of the second pressure reducing device 10 of the first embodiment. Therefore, the second pressure reducing device 10 can be easily manufactured.

In the same manner as that of the first embodiment, the first pressure reducing device 4 of second embodiment is a pressure control valve for controlling the high pressure to be a target high pressure determined by the refrigerant temperature at the outlet of the radiator.

Figure 4:
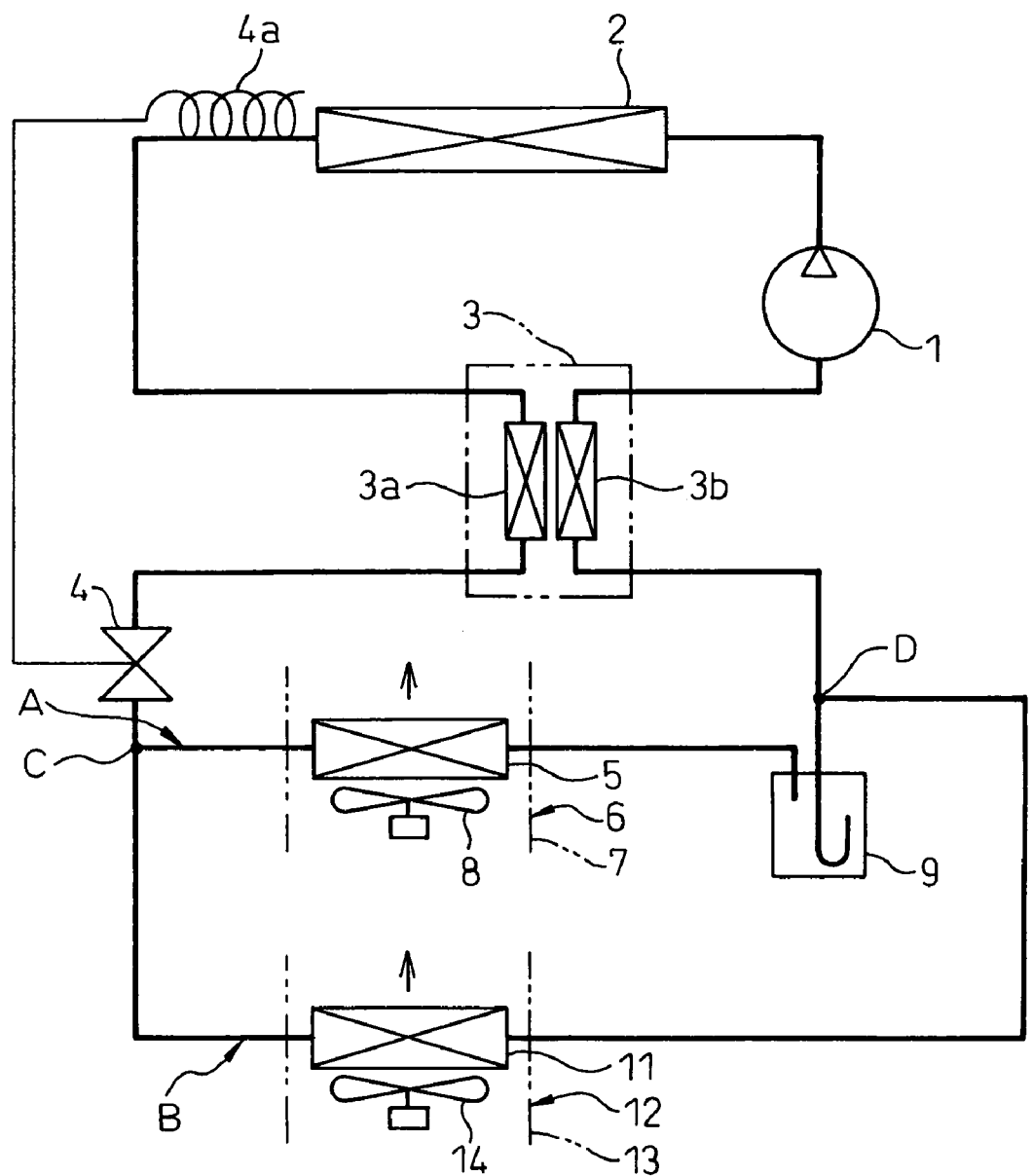
FIG. 4 is an arrangement view showing a refrigerating cycle of the third embodiment of the present invention.

Next, the third embodiment will be explained below. FIG. 4 is a view showing the third embodiment. In this third embodiment, the second pressure reducing device 10 in the above second embodiment is abolished, and only the first pressure reducing device 4 is provided as the pressure reducing means. Due to this structure, the manufacturing cost can be further reduced.

According to the third embodiment, a ratio of distribution of the refrigerant flow rate of the first refrigerant passage A to the refrigerant flow rate of the second refrigerant passage B can be determined by the ratio of passage resistance of the first refrigerant passage A to the second refrigerant passage B, that is, a ratio of distribution of the refrigerant flow rate of the first refrigerant passage A to the refrigerant flow rate of the second refrigerant passage B can be determined by the ratio of the resistance of the passage A to the resistance of the passage B between the branch point C and the confluence point D of both the passages A and B.

Figure 5A:
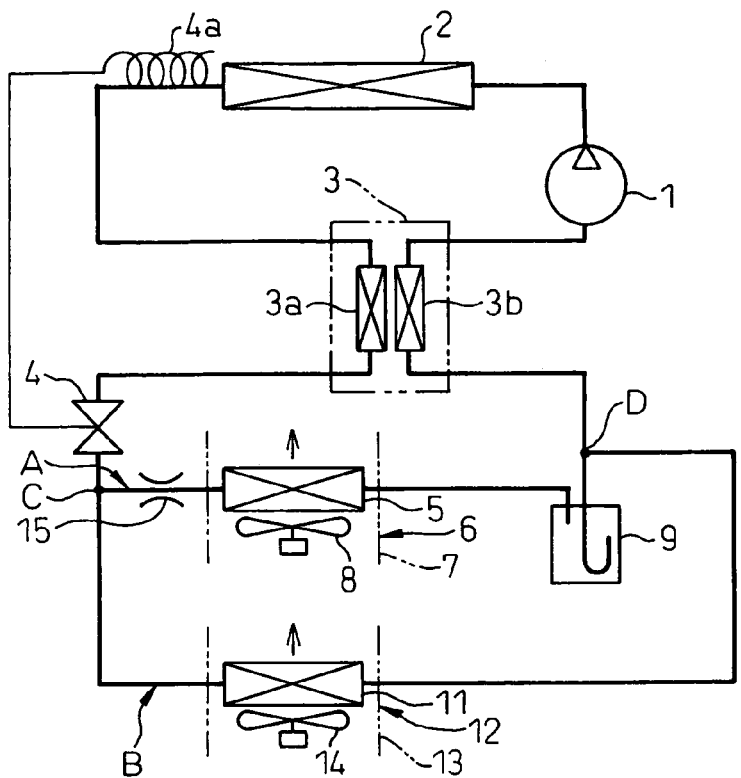
FIG. 5A is an arrangement view showing a refrigerating cycle of the fourth embodiment.

Next, the fourth embodiment will be explained below. FIG. 5A is a view showing the fourth embodiment. This fourth embodiment is composed in such a manner that the auxiliary throttling mechanism 15 for adjusting the passage resistance is added to the inlet side of the first evaporator 5 in the third embodiment. This auxiliary throttling mechanism 15 is composed of a fixed throttle such as an orifice or capillary tube.

By this auxiliary throttling mechanism 15, a ratio of distribution of the refrigerant flow rate of the first refrigerant passage A to the refrigerant flow rate of the second refrigerant passage B can be previously appropriately set according to the ratio of the cooling load of the first evaporator 5 to the cooling load of the second evaporator 11.

In this connection, in the fourth embodiment, according to a change in the ratio of the cooling load of the first evaporator 5 to the cooling load of the second evaporator 11 and also according to a change in the ratio of the passage resistance of the first refrigerant passage A to the passage resistance of the second refrigerant passage B, the auxiliary throttling mechanism 15 may be arranged not in the first refrigerant passage A but in the second refrigerant passage B. Accordingly, it can be said that the second pressure reducing device 10 of the second embodiment (shown in FIG. 3) fulfills a function of this auxiliary throttling mechanism 15 at the second refrigerant passage B side.

Figure 5B:
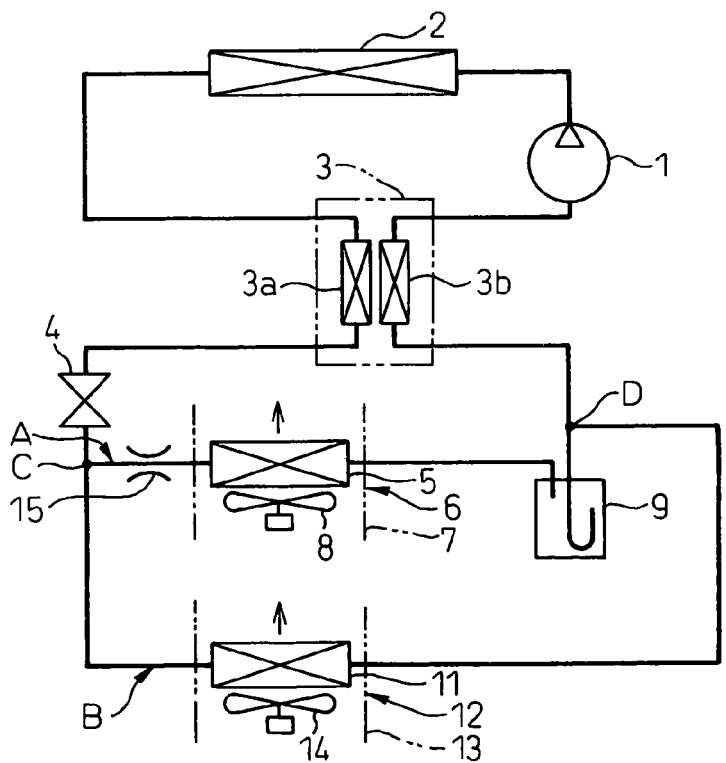
FIG. 5B is an arrangement view showing a refrigerating cycle of the fourth embodiment.

In FIG. 5A, the first pressure reducing device 4 is composed of a pressure control valve (variable throttle) to control the high pressure according to the refrigerant temperature at the outlet of the radiator which is sensed by the temperature sensing portion 4a. However, the first pressure detecting device 4 may be composed of a fixed throttle having no temperature sensing portion 4a as shown in FIG. 5B. Due to the foregoing, the pressure reducing means for the first and the second evaporator 5, 11 can be composed of only one fixed throttle. Therefore, the manufacturing cost can be further reduced.

In the same manner, in the third embodiment (shown in FIG. 4) described before, the first pressure reducing device 4 may be composed of a fixed throttle.

Figure 6:
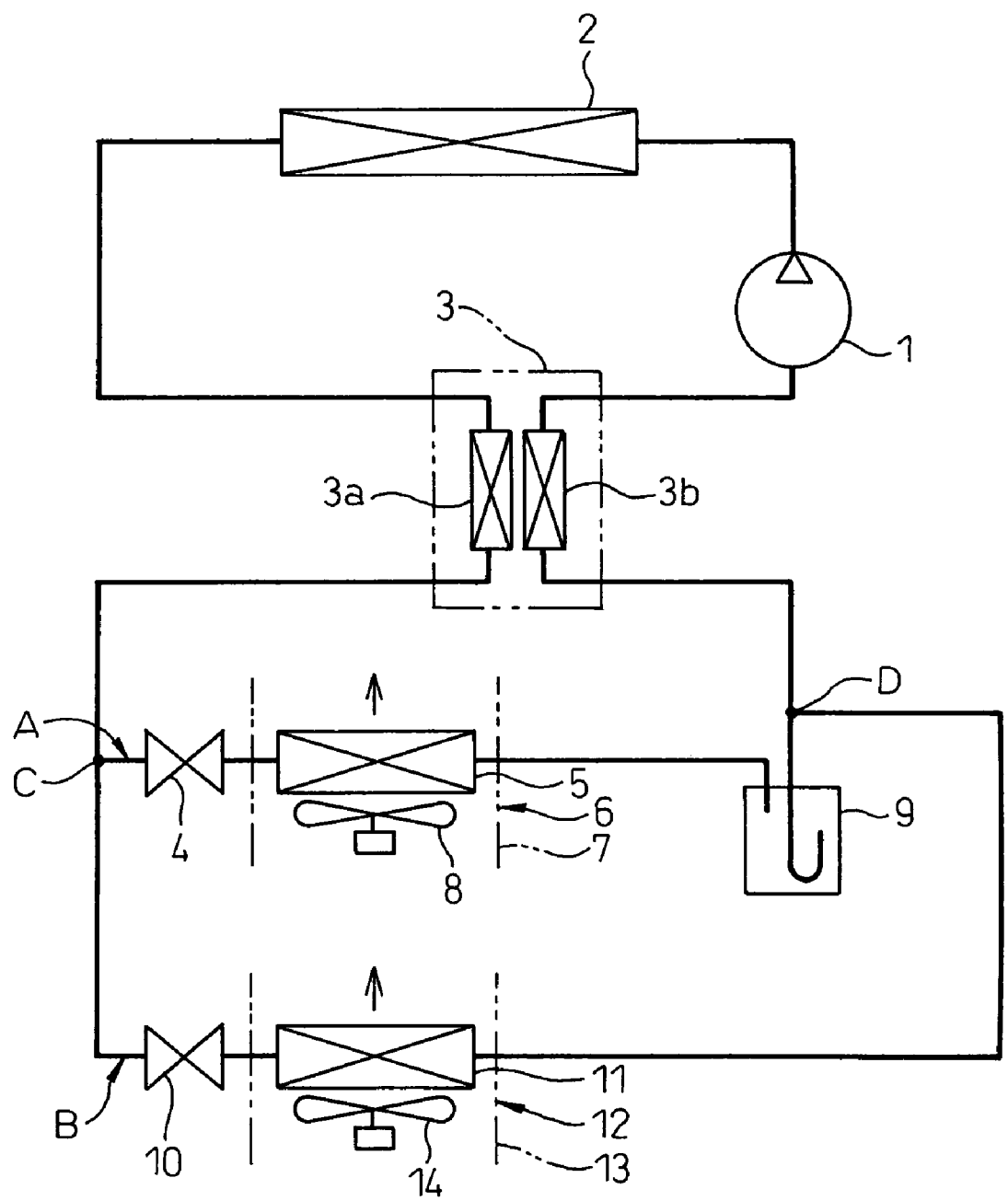
FIG. 6 is an arrangement view showing a refrigerating cycle of the fifth embodiment of the present invention.

Next, the fifth embodiment will be explained below. FIG. 6 is a view showing the fifth embodiment. The fifth embodiment is composed in such a manner that the first pressure reducing device 4 is also formed of a fixed throttle such as an orifice in the first embodiment. Due to the above structure, both the pressure reducing devices 4, 10 at the front and the rear seat side are respectively composed of a fixed throttle. Therefore, the effect of reducing the manufacturing cost can be further enhanced.

However, according to the fifth embodiment, no function of controlling the high pressure is provided. Therefore, the high pressure is controlled according to the fluctuation of the cycle operating condition, and it is impossible to conduct an effective operation by the most appropriate COP.

However, in the fifth embodiment, the outlet refrigerant of the second evaporator 11 is joined to the refrigerant of the first refrigerant passage A at the outlet side of the accumulator 9. Therefore, the phase state of the outlet refrigerant of the first evaporator 5 can be always stably controlled to be a state of saturated gas without being affected by the phase state of the outlet refrigerant of the second evaporator 11. Further, in the same manner as that of the first embodiment, the liquid refrigerant contained in the outlet refrigerant of the second evaporator 11 can be effectively used for cooling the high pressure refrigerant by the internal heat exchanger 3.

Figure 7:
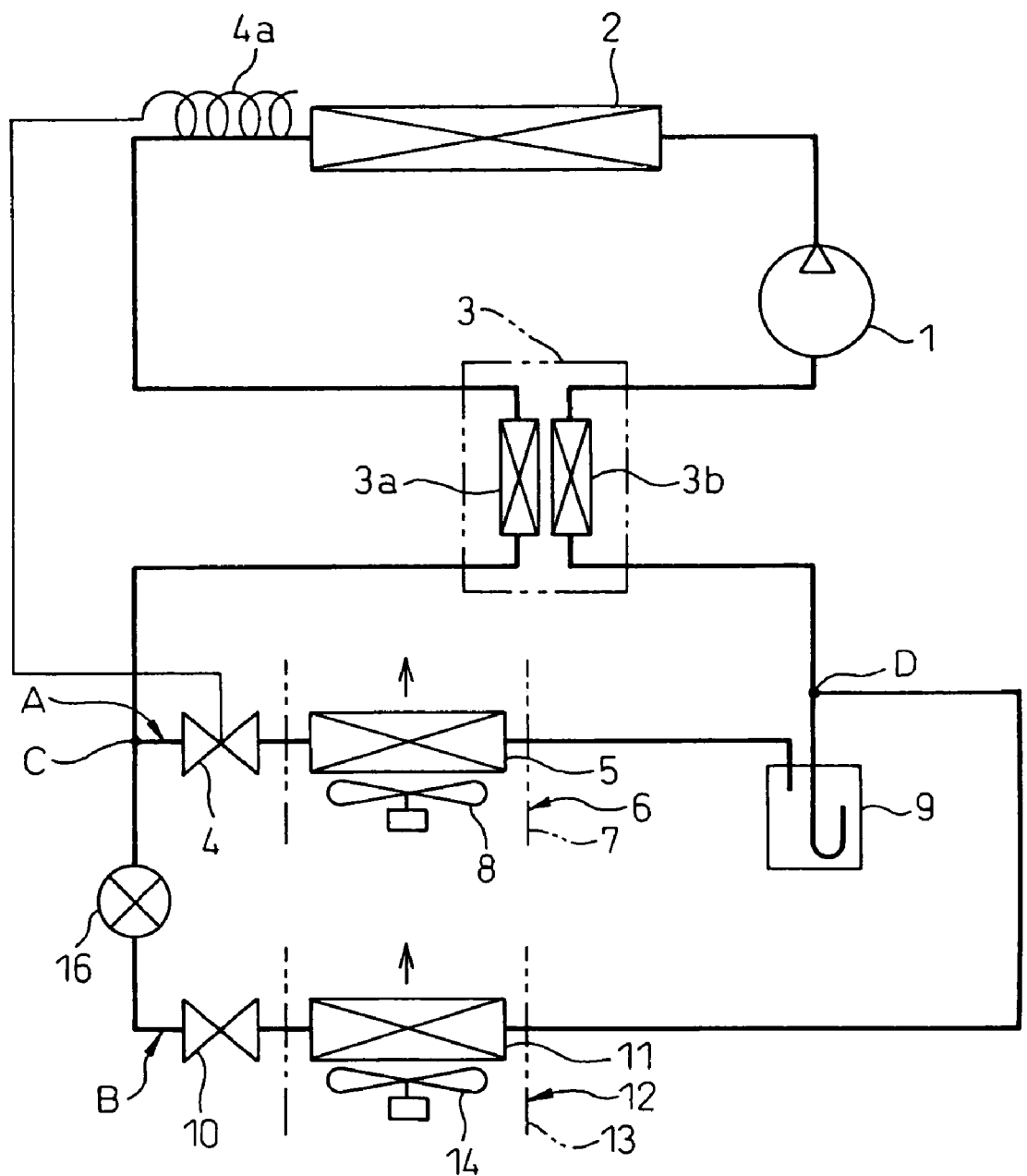
FIG. 7 is an arrangement view showing a refrigerating cycle of the sixth embodiment of the present invention.

Next, the sixth embodiment will be explained below. FIG. 7 is a view showing the sixth embodiment. The sixth embodiment is composed in such a manner that the electromagnetic valve 16 composing an opening and closing valve for interrupting the refrigerant flow of the second refrigerant passage B is provided in the second refrigerant passage B in the first embodiment.

Specifically, the sixth embodiment is arranged as follows. The electromagnetic valve 16 is provided on the inlet side of the second pressure reducing device 10. When the cooling action of the second evaporator 11 is not needed, that is, when the operation of the rear seat side air conditioning unit 12 is stopped, the electromagnetic valve 16 is closed, so that the refrigerant flow in the second refrigerant passage B can be shut off. In this connection, the electromagnetic valve 16 may be arranged on the outlet side of the second pressure reducing device 10.

In FIG. 7, the second pressure reducing device 10 and the electromagnetic valve 16 are illustrated as if they were different parts. However, as the second pressure reducing device 10 is composed of a fixed throttle, the orifice composing the throttling passage can be integrally formed in the refrigerant passage in the housing (not shown) of the electromagnetic valve 16. Due to this structure, the second pressure reducing device 10 and the electromagnetic valve 16 can be integrated with each other into one body.

Instead of the electromagnetic valve 16, an electrical three-way valve may be provided at the branch point C of the first refrigerant passage A and the second refrigerant passage B. When this three-way valve changes over the passage, either the state in which the refrigerant flows only in the first refrigerant passage A, the state in which the refrigerant flows only in the second refrigerant passage B or the state in which the refrigerant flows in both the passages A and B may be selected. Concerning this three-way changeover valve, refer to the three-way changeover valve 17 shown in FIGS. 13 and 14 described later.

Figure 8:
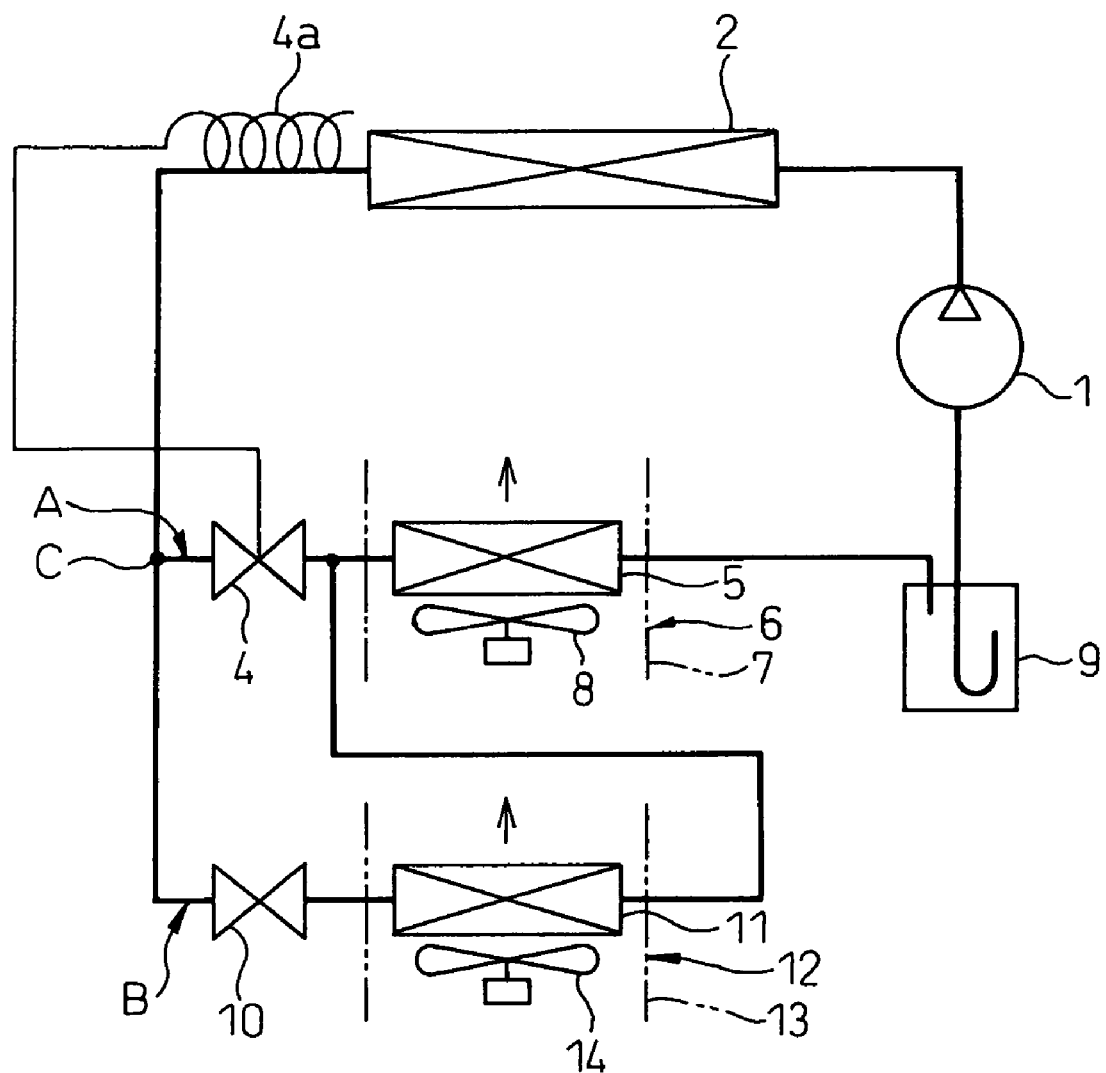
FIG. 8 is an arrangement view showing a refrigerating cycle of the seventh embodiment of the present invention.

Next, the seventh embodiment will be explained below. FIG. 8 is a view showing the seventh embodiment. In the refrigerating cycle having no internal heat exchanger 3, the outlet side (the downstream end of the second refrigerant passage B) of the second evaporator 11 is connected between the outlet side of the first pressure reducing device 4 and the inlet side of the first evaporator 5. That is, the series passage of the second pressure reducing device 10 and the second evaporator 11 is connected to the first pressure reducing device 4 in parallel. Due to this structure, the refrigerant passing through the second evaporator 11 flows to the inlet side of the first evaporator 5.

In the seventh embodiment, the second pressure reducing device 10 is composed of a fixed throttle. Therefore, the second pressure reducing device 10 has no function of controlling the phase state of the outlet refrigerant of the second evaporator 11. Accordingly, when the cooling load of the second evaporator 11 is decreased, the outlet refrigerant of the second evaporator 11 is put into a state of wet steam containing the liquid refrigerant. Even in this case, the outlet refrigerant of the second evaporator 11 flows into the inlet side of the first evaporator 5. Therefore, this liquid phase refrigerant can be effectively used for exhibiting the cooling performance of the first evaporator 5.

As the compressor 1 sucks the saturated gas which has passed through the accumulator 9, the liquid refrigerant can be positively prevented from returning back to the compressor 1.

As the second pressure reducing device 10 is composed of a fixed throttle, even when the cycle operating condition fluctuates, the degree of opening of the second pressure reducing device 10 is not changed. Accordingly, the high pressure can be stably controlled only by the first pressure reducing device 4.

Figure 9:
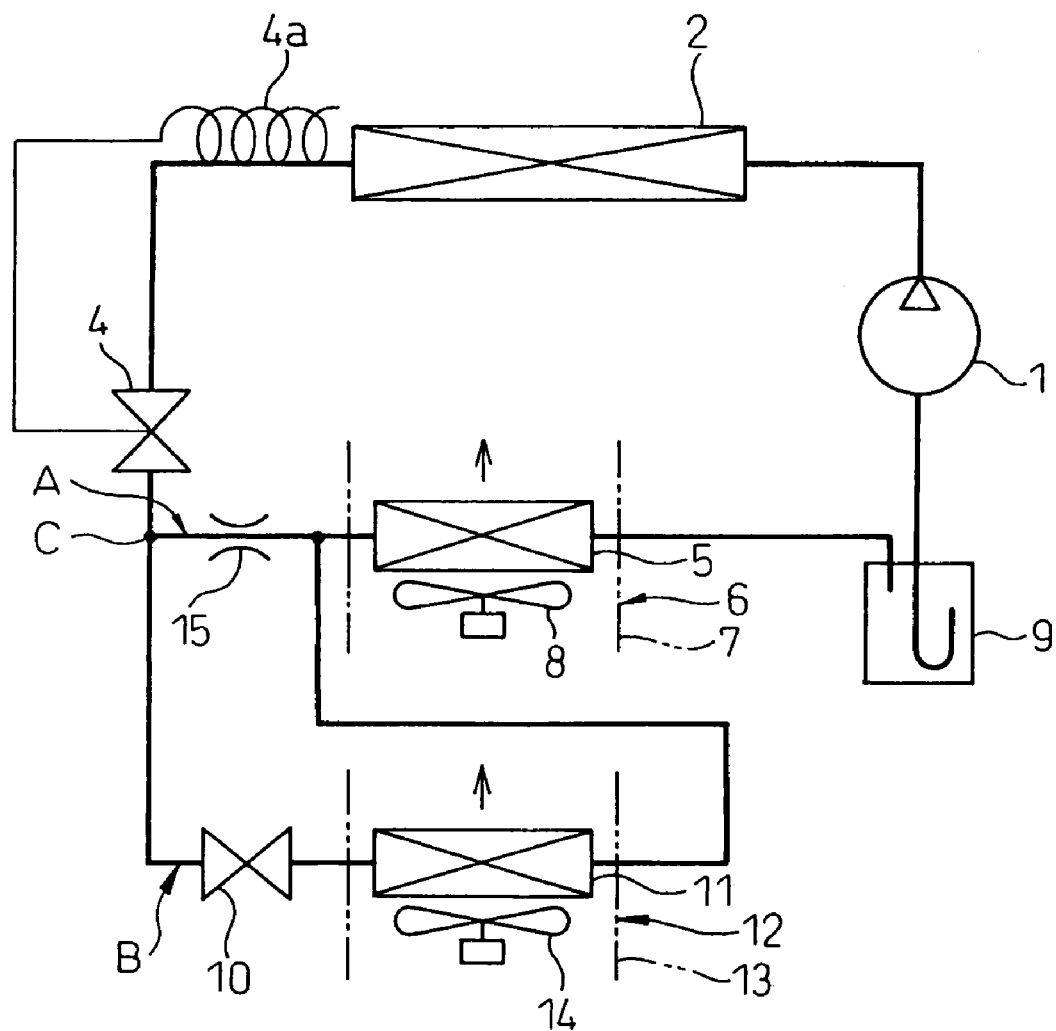
FIG. 9 is an arrangement view showing a refrigerating cycle of the eighth embodiment of the present invention.

Next, the eighth embodiment will be explained below. FIG. 9 is a view showing the eighth embodiment. This eighth embodiment is composed in such a manner that the first pressure reducing device 4 in the above seventh embodiment is arranged on the upstream side of the branch point C of the first refrigerant passage A and the second refrigerant passage B. This first pressure reducing device 4 is arranged in the same manner as that of the second embodiment shown in FIG. 3.

However, in the eighth embodiment, the outlet side of the second evaporator 11 is connected to the inlet side of the first evaporator 5, and the auxiliary throttling mechanism 15 is arranged in a portion of the first refrigerant passage A right after the branch point C. Therefore, a predetermined pressure loss can be generated between both end portions of the series passage composed of the second pressure reducing device 10 and the second evaporator 11. In the same manner as that of the fourth embodiment shown in FIG. 5, this auxiliary throttling mechanism 15 is composed of a fixed throttle such as an orifice or capillary tube.

In the eighth embodiment, the refrigerant, which has passed through the second evaporator 11, flows onto the inlet side of the first evaporator 5. Therefore, the same operational effect as that of the seventh embodiment can be exhibited. In addition to that, as the second pressure reducing device 10 is arranged in the passage of the low pressure refrigerant which has passed through the first pressure reducing device 4, the degree of the throttle opening of the second pressure reducing device 10 may be sufficiently larger than that of the second pressure reducing device 10 of the seventh embodiment. Accordingly, the second pressure reducing device 10 can be easily manufactured.

Figure 10:
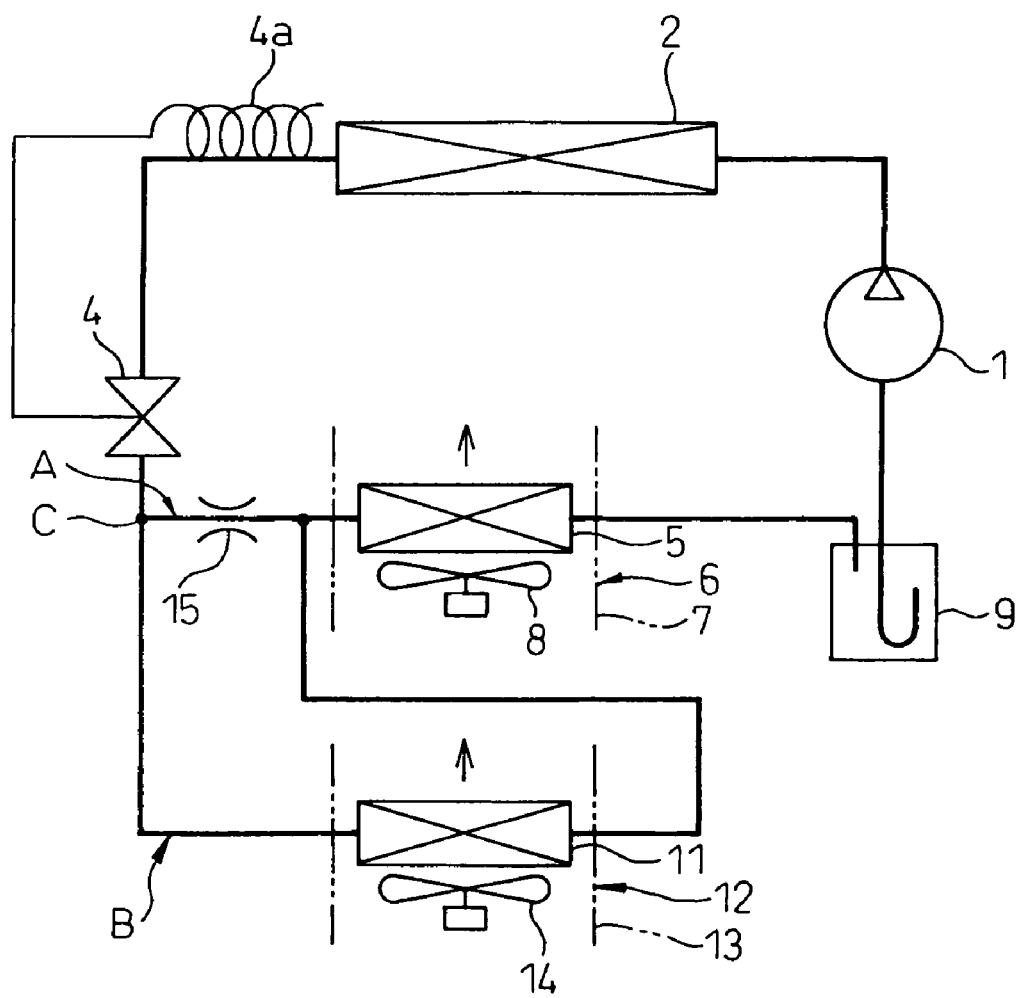
FIG. 10 is an arrangement view showing a refrigerating cycle of the ninth embodiment of the present invention.

Next, the ninth embodiment will be explained below. FIG. 10 is a view showing the ninth embodiment. This ninth embodiment is composed in such a manner that the second pressure reducing device 10 arranged in the second refrigerant passage B of the above eighth embodiment is abolished.

Therefore, according to the ninth embodiment, the second refrigerant passage B having only the second evaporator 11 is connected in parallel with the auxiliary throttling mechanism 15. Accordingly, a distribution of the refrigerant flow rate to the first evaporator 5 and the second evaporator 11 can be determined by the ratio of the passage resistance of the auxiliary throttling mechanism 15 to the passage resistance of the second refrigerant passage B. Therefore, the distribution of the refrigerant flow rate can be adjusted by selecting the passage resistance (the throttle opening degree) of the auxiliary throttling mechanism 15.

In this embodiment, the first pressure reducing device 4 is composed of a pressure control valve (variable throttle) for controlling the high pressure, however, the first pressure reducing device 4 may be composed of a fixed throttle. Due to the foregoing, the pressure reducing means for the first and the second evaporator 5, 11 can be composed of only one fixed throttle. Accordingly, the manufacturing cost can be further reduced.

Figure 11:
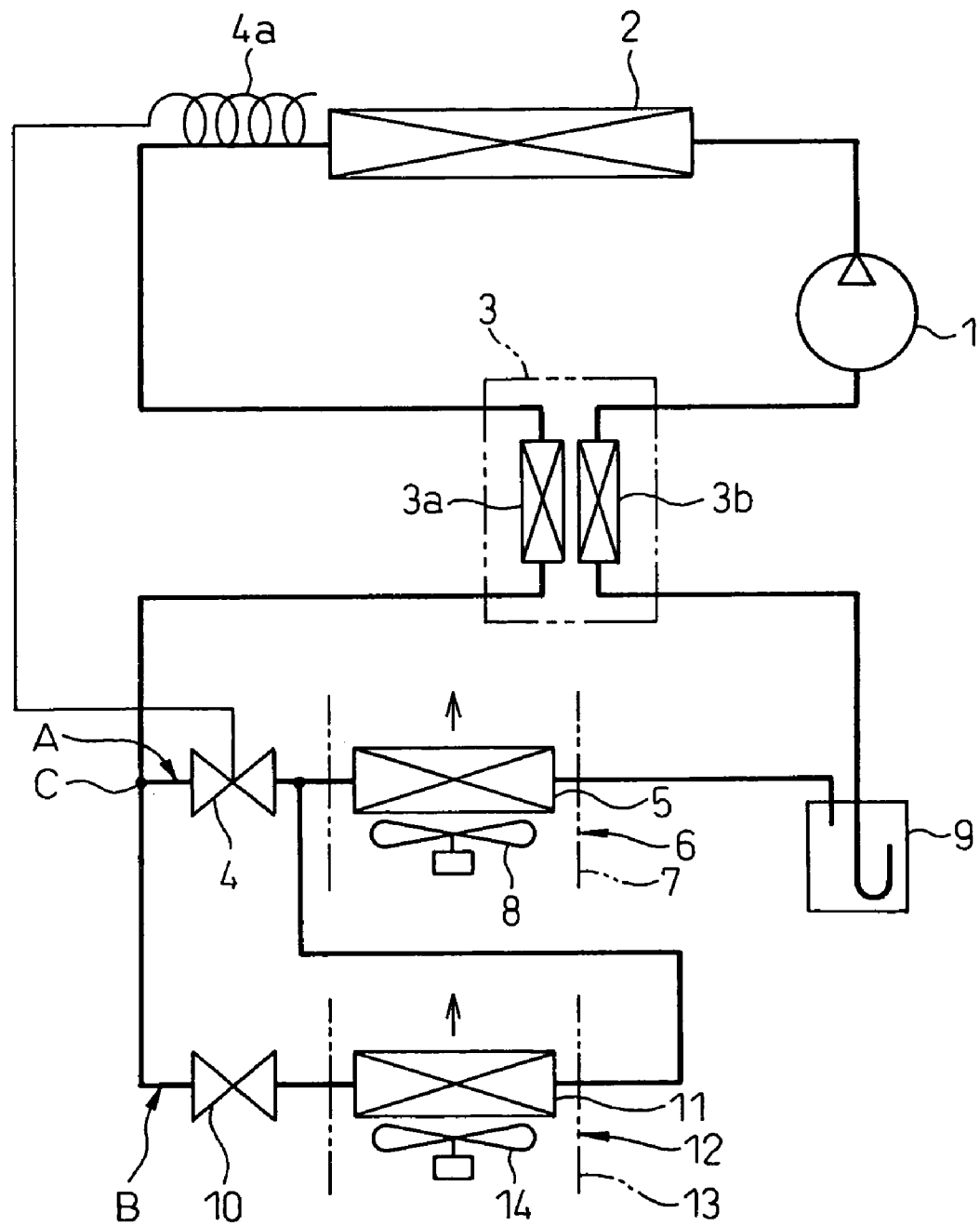
FIG. 11 is an arrangement view showing a refrigerating cycle of the tenth embodiment of the present invention.

Next, the tenth embodiment will be explained below. FIG. 11 is a view showing the tenth embodiment. This tenth embodiment is composed in such a manner that the internal heat exchanger 3 is added to the structure of the seventh embodiment shown in FIG. 8 so that COP can be enhanced.

Figure 12:
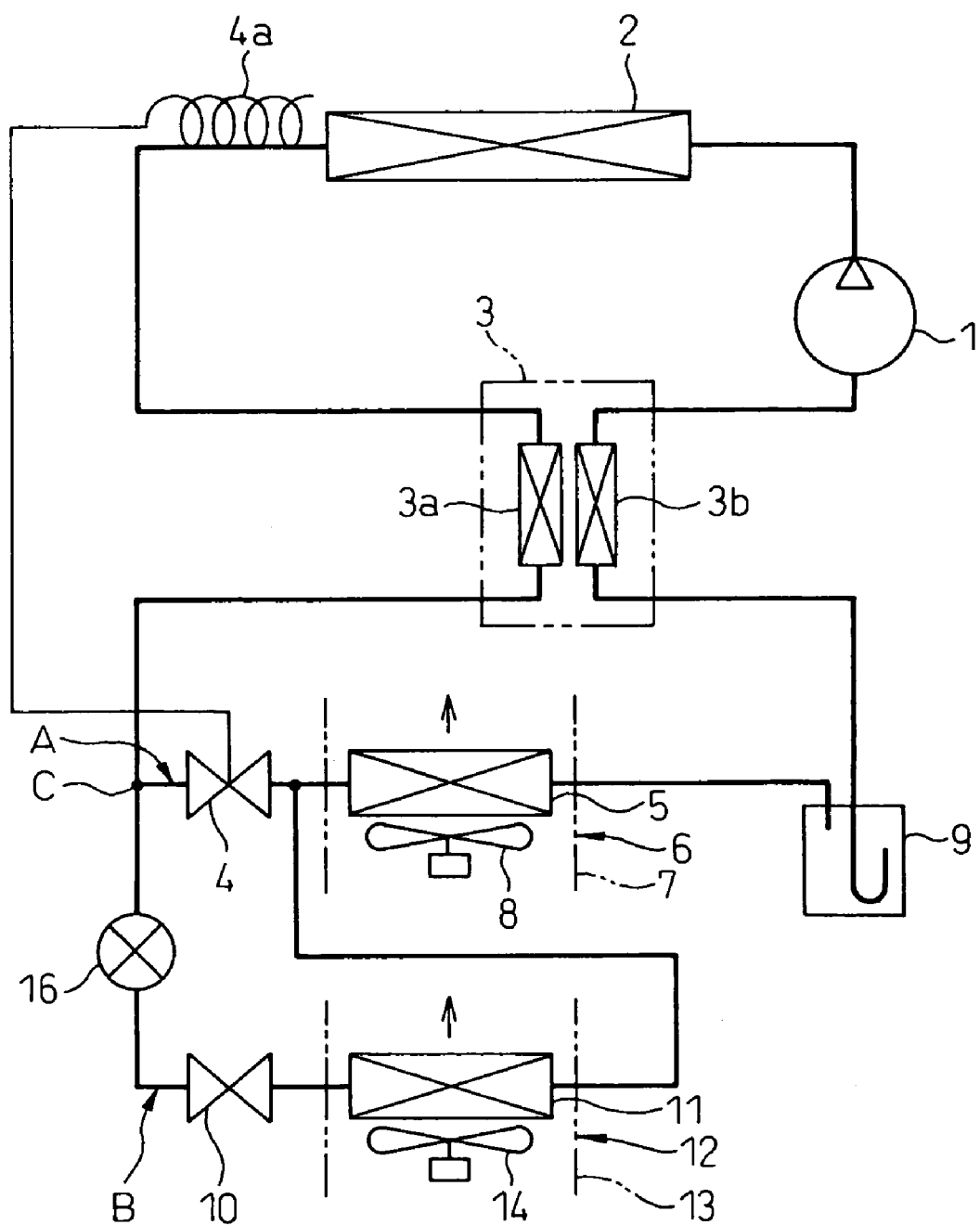
FIG. 12 is an arrangement view showing a refrigerating cycle of the eleventh embodiment of the present invention.

Next, the eleventh embodiment will be explained below. FIG. 12 is a view showing the eleventh embodiment. This eleventh embodiment is composed in such a manner that the electromagnetic valve 16, which is an opening and closing valve for making a flow of the refrigerant in the second refrigerant passage B switch on and off, is arranged in the above tenth embodiment shown in FIG. 11. In the same manner as that of the electromagnetic valve 16 of the sixth embodiment, this electromagnetic valve 16 shuts off a refrigerant flow in the second refrigerant passage B at the time of stoppage of the operation of the rear seat side air conditioning unit 12.

As described before in the sixth embodiment, the position at which the electromagnetic valve 16 is arranged is not limited to the inlet side of the second pressure reducing device 10, that is, the position at which the electromagnetic valve 16 is arranged may be the outlet side of the second pressure reducing device 10. Further, the electromagnetic valve 16 may be integrated with the second pressure reducing device 10 composed of a fixed throttle.

Figure 13:
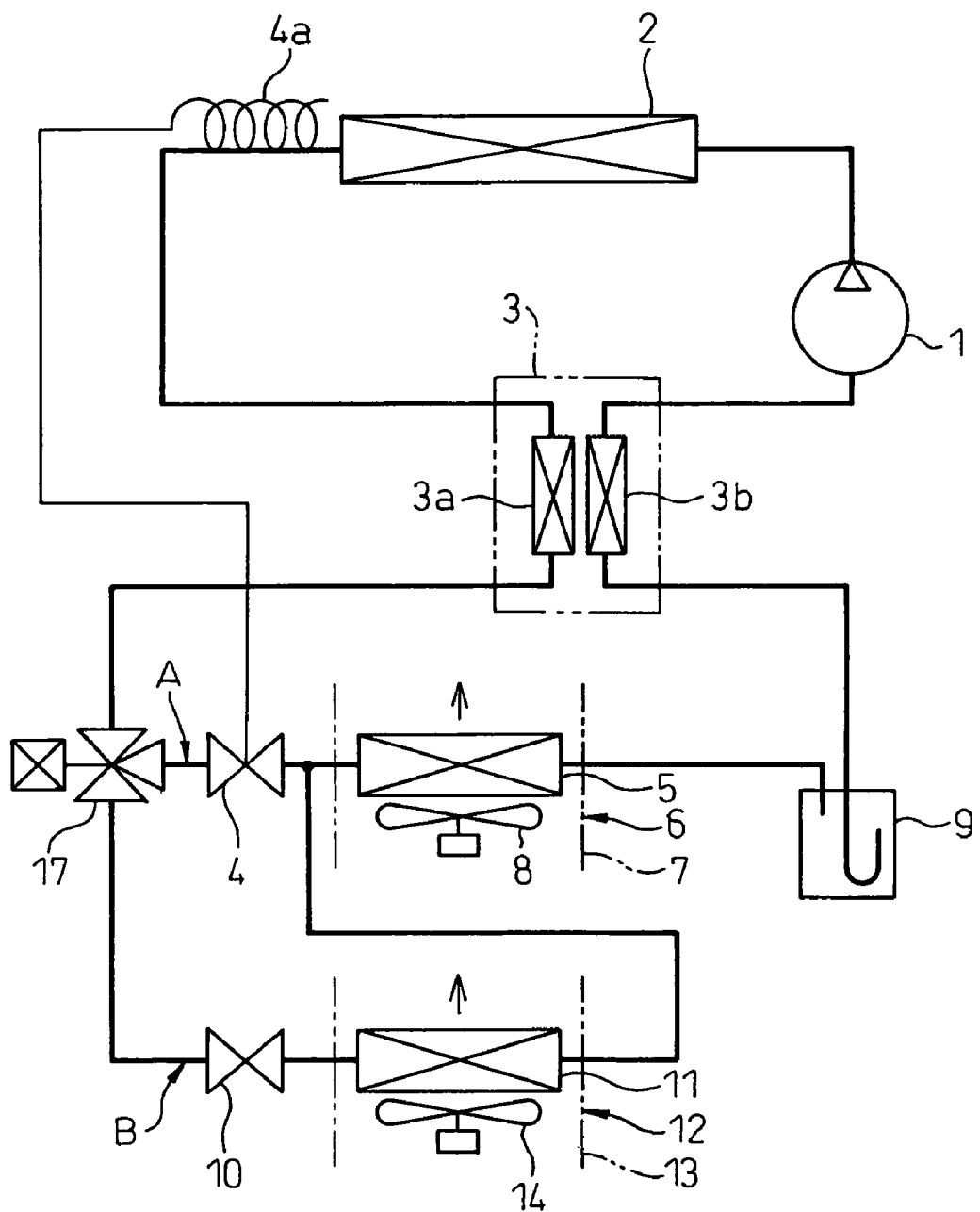
FIG. 13 is an arrangement view showing a refrigerating cycle of the twelfth embodiment of the present invention.

Next, the twelfth embodiment will be explained below. FIG. 13 is a view showing the twelfth embodiment. This twelfth embodiment is composed in such a manner that instead of the electromagnetic valve 16 of the eleventh embodiment shown in FIG. 12, an electrical type three-way valve 17 is arranged at the branch point of the first refrigerant passage A and the second refrigerant passage B.

When this three-way valve 17 changes over the passage, either the state in which the refrigerant flows only in the first refrigerant passage A, the state in which the refrigerant flows only in the second refrigerant passage B or the state in which the refrigerant flows in both the passages A and B can be selected.

Figure 14:
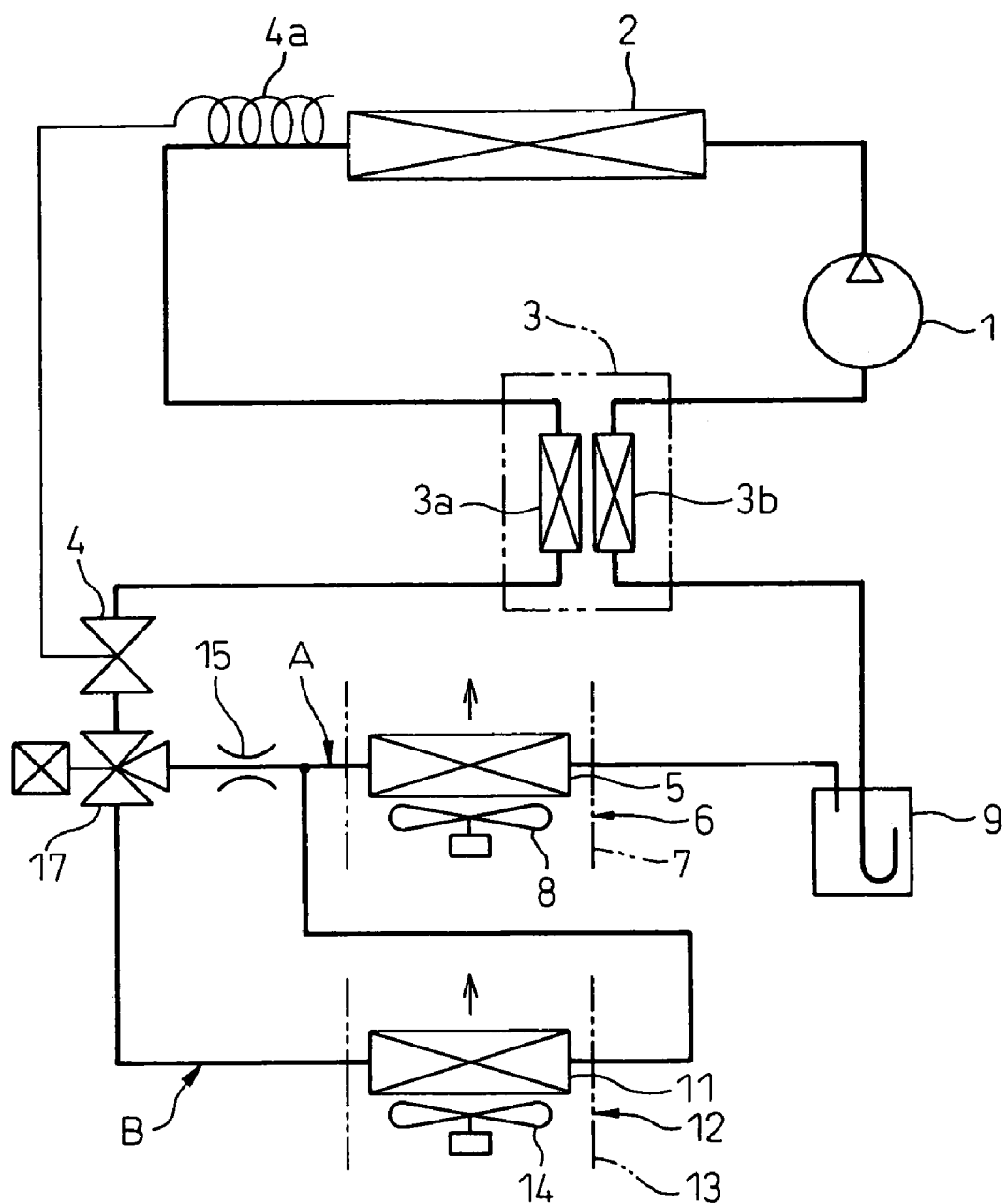
FIG. 14 is an arrangement view showing a refrigerating cycle of the thirteenth embodiment of the present invention.

Next, the thirteenth embodiment will be explained below. FIG. 14 is a view showing the thirteenth embodiment. This thirteenth embodiment is composed in such a manner that the electrical type three-way valve 17 is arranged at the branch point of the first refrigerant passage A and the second refrigerant passage B in the cycle structure of the ninth embodiment shown in FIG. 10. The passage changeover action of the three-way valve 17 is the same as that of the twelfth embodiment.

In this connection, in the cycle structure of the eighth embodiment shown in FIG. 9, the electrical type three-way valve 17 may be arranged at the branch point of the first refrigerant passage A and the second refrigerant passage B.

Figure 15:
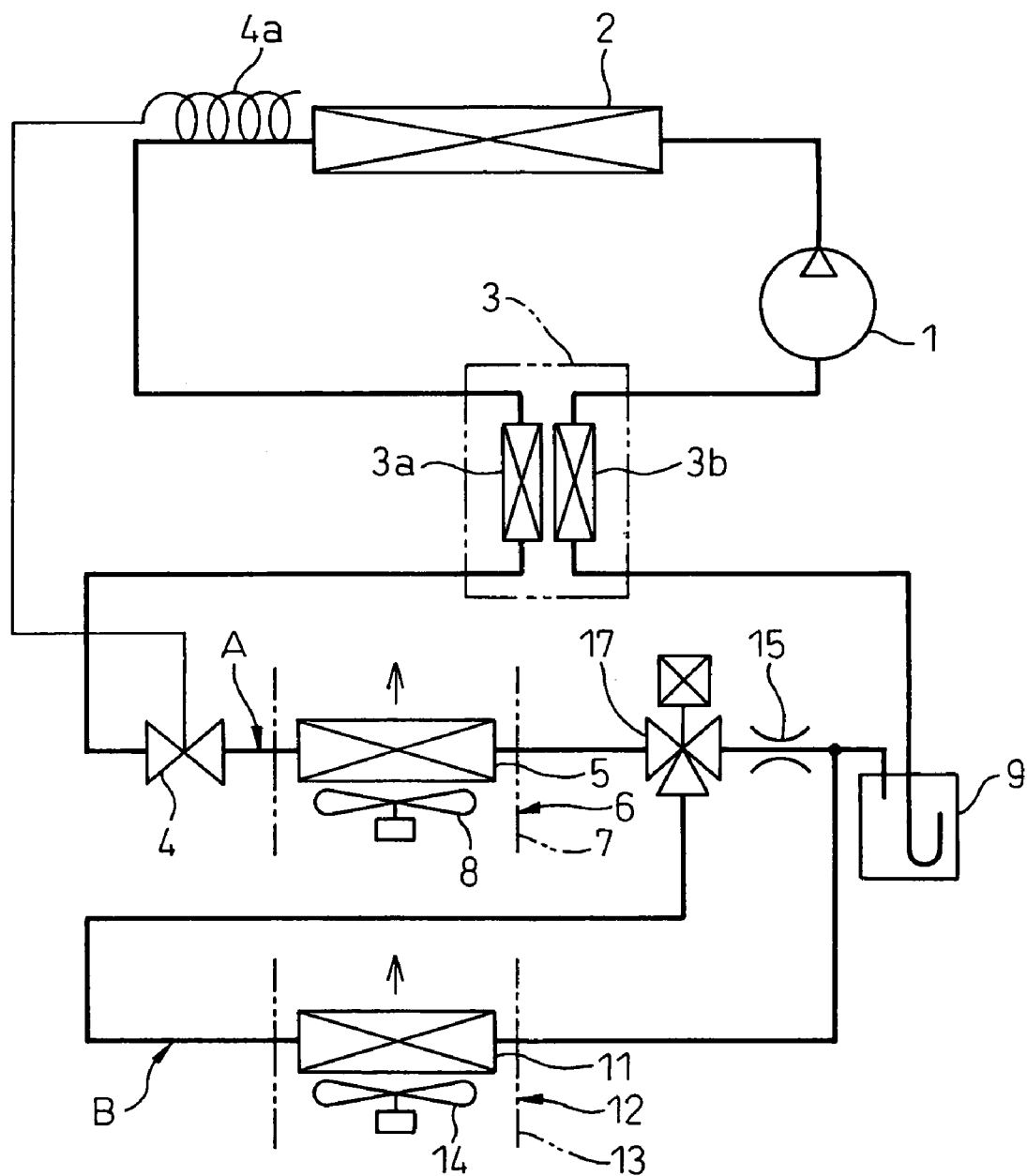
FIG. 15 is an arrangement view showing a refrigerating cycle of the fourteenth embodiment of the present invention.

Next, the fourteenth embodiment will be explained below. In any of the seventh embodiment, shown in FIG. 8, to the thirteenth embodiment, shown in FIG. 14, the outlet side of the second evaporator 11 is connected to a portion between the outlet side of the first pressure reducing device 4 and the inlet side of the first evaporator 5, so that the refrigerant passing through the second evaporator 11 can flow onto the inlet side of the first evaporator 5. However, in the fourteenth embodiment, as shown in FIG. 15, the second evaporator 11 is connected to the outlet side of the first evaporator 5 so that the refrigerant passing through the first evaporator 5 can flow onto the inlet side of the second evaporator 11.

The electrical three-way changeover valve 17 is arranged at the branch point of the outlet side of the first evaporator 5 and the inlet side of the second evaporator 11. Further, the auxiliary throttling mechanism 15 is arranged on the outlet side of this three-way changeover valve 17, so that a predetermined pressure loss can be generated between both end portions of the second refrigerant passage B having only the second evaporator 11.

This three-way changeover valve 17 changes over the passage so that one of the following three states can be selected.

(1) The state in which the refrigerant flows in the order of the first pressure reducing device 4→the first evaporator 5→the three-way changeover valve 17→the auxiliary throttling mechanism 15→the accumulator 9, that is, the state in which the refrigerant flows only in the first evaporator 5.

(2) The state in which the refrigerant flows in the order of the first pressure reducing device 4→the first evaporator 5→the three-way changeover valve 17→the second evaporator→the accumulator 9, that is, the state in which the refrigerant flows in the first evaporator 5 and the second evaporator 11 in series.

(3) The state in which the refrigerant, which has passed through the first evaporator 5, flows in the auxiliary throttling mechanism 15 and the second evaporator 11 in parallel.

In this connection, in the thirteenth and the fourteenth embodiment, the three-way changeover valve 17 and the auxiliary throttling mechanism 15 are illustrated as if they were different parts. However, as the auxiliary throttling mechanism 15 can be composed of a fixed throttle, the auxiliary throttling mechanism 15 may be integrated with the refrigerant passage in the housing of the three-way changeover valve 17.

Figure 16:
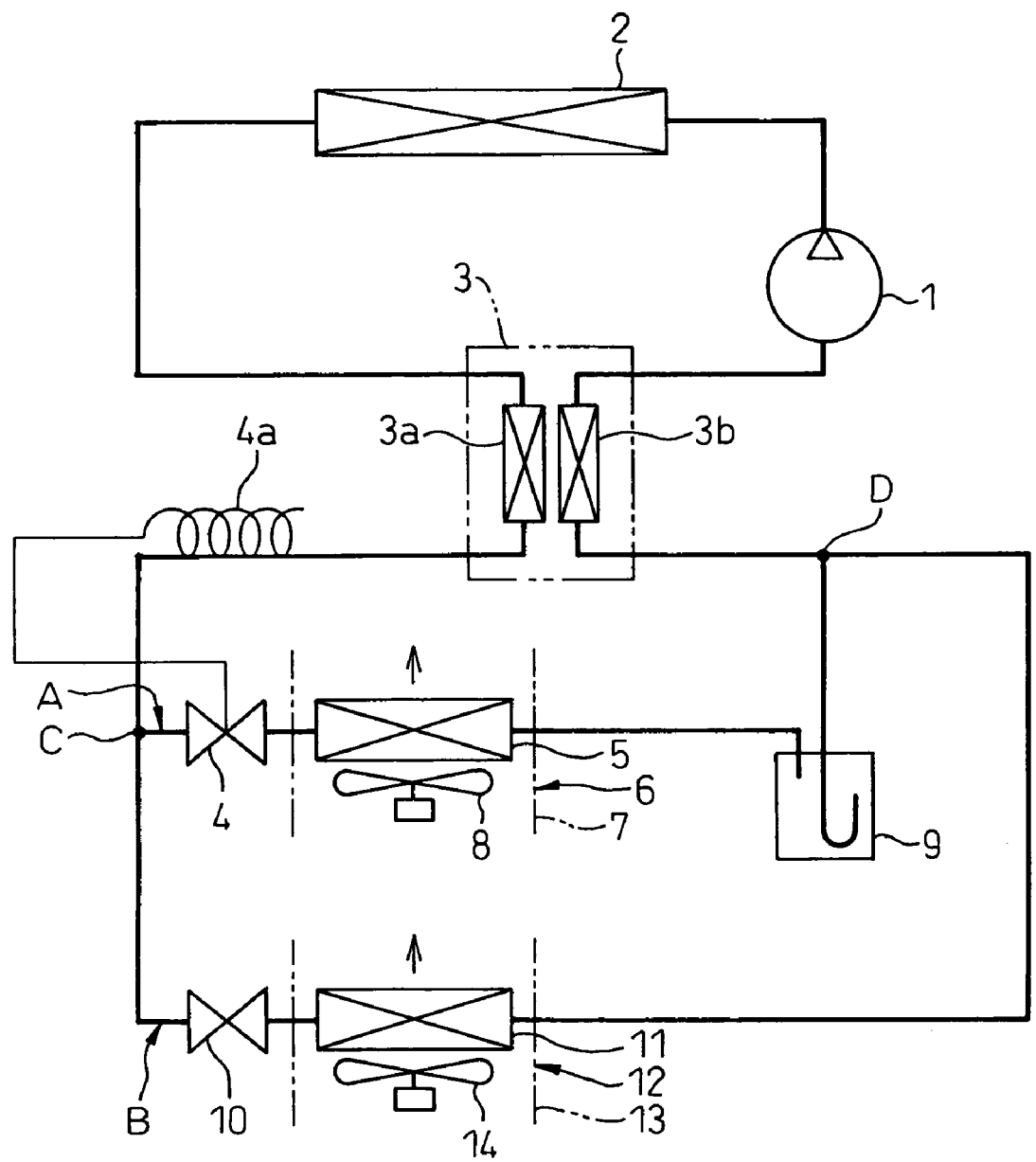
FIG. 16 is an arrangement view showing a refrigerating cycle of the fifteenth embodiment of the present invention.

Next, the fifteenth embodiment will be explained below. In the first embodiment and others, the temperature sensing portion 4a of the first pressure reducing device 4 is arranged between the outlet side of the radiator 2 and the inlet side of the high pressure side refrigerant passage 3a of the internal heat exchanger 3. However, in the fifteenth embodiment, as shown in FIG. 16, the temperature sensing portion 4a of the first pressure reducing device 4 is arranged on the outlet side of the high pressure side refrigerant passage 3a of the internal heat exchanger 3. Even in this structure, the same high pressure controlling function can be exhibited by the first pressure reducing device 4.

Figure 17:
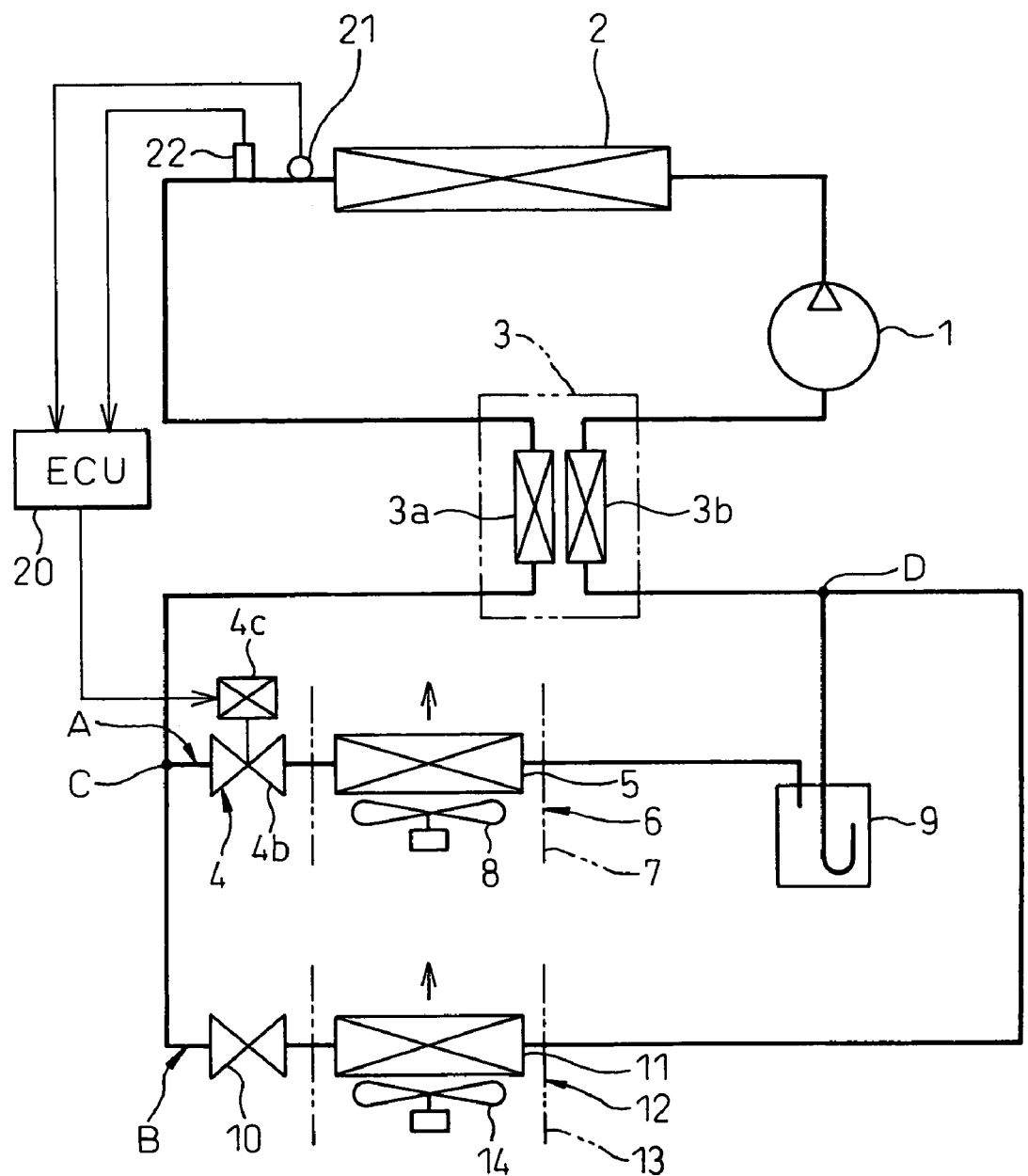
FIG. 17 is an arrangement view showing a refrigerating cycle of the sixteenth embodiment of the present invention.

Next, the sixteenth embodiment will be explained below. In the first embodiment and others, the first pressure reducing device 4 is composed of a mechanical valve mechanism. However, in the sixteenth embodiment, the first pressure reducing device 4 is composed of an electrical type valve mechanism for adjusting the degree of opening by an electrical mechanism as shown in FIG. 17.

Specifically, the first pressure reducing device 4 includes: a valve body 4b for adjusting the degree of opening; and an electrical actuator 4c such as a servo motor for driving this valve body 4b. Operation of this electrical actuator 4c is controlled by the control output of the control unit 20 composed of a computer and other devices.

On the other hand, the temperature sensor 21 for detecting the refrigerant temperature and the pressure sensor 22 for detecting the refrigerant pressure are provided on the outlet side of the radiator 2, and detection signals of both sensors 21, 22 are inputted into the control unit 20. According to the detected temperature (the refrigerant temperature at the outlet of the radiator) detected by the temperature sensor 21, the control unit 20 calculates a target pressure for maximizing COP and controls the operation of the electrical actuator 4c so that the actual high pressure detected by the pressure sensor 22 can become the calculated target pressure, and the degree of opening (the degree of throttle opening) of the valve body 4b of the first pressure reducing device 4 is adjusted.

In this connection, in the cycle structure of the first embodiment, the first pressure reducing device 4 is composed of an electrical type valve mechanism. However, of course, the first pressure reducing mechanism 4 for fulfilling the high pressure control function may be composed of the same electrical type valve mechanism in the other embodiments.

The position at which the pressure sensor 22 is arranged is not limited to the outlet side of the radiator 2. The pressure sensor 22 may be arranged at any position in the high pressure side refrigerant passage from the discharge side of the compressor 1 to the inlet side of the pressure reducing device 4, 10.

Next, the seventeenth embodiment will be explained below. In any of the embodiments described above, the second pressure reducing device 10 is composed of a fixed throttle. However, the second pressure reducing device 10 may be composed of a variable throttle.

Figure 18A:
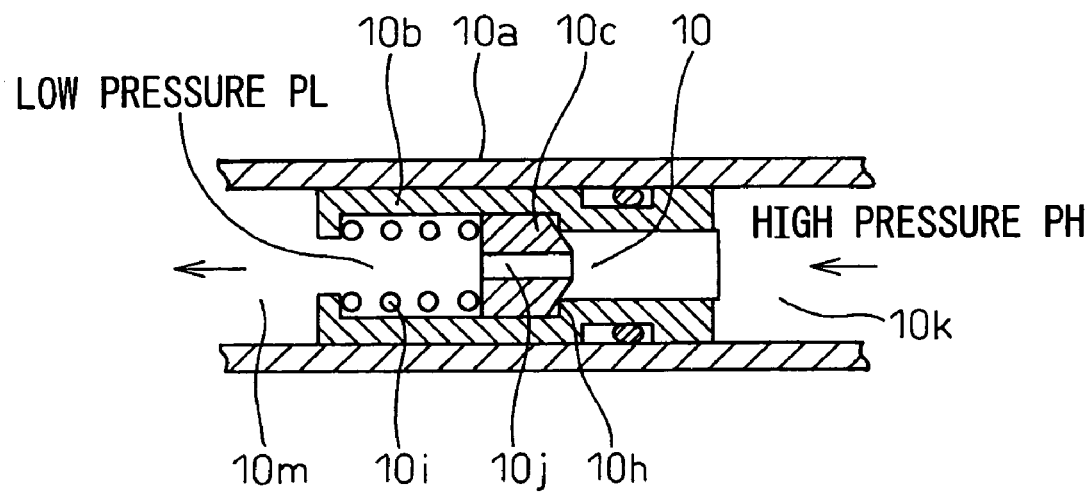
FIG. 18A is an overall sectional view showing a differential pressure regulating valve composing the second pressure reducing device in the seventeenth embodiment.
Figure 18B:
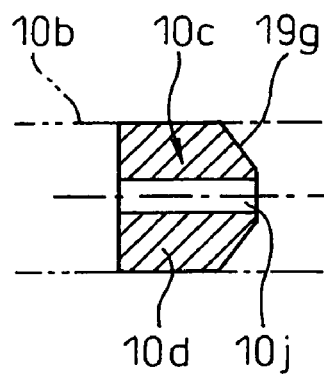
FIG. 18B is a sectional view of the valve body.

In the seventeenth embodiment, the second pressure reducing device 10 is composed of this variable throttle. FIGS. 18A and 18B are views showing the second pressure reducing device 10 composed of the variable throttle of the seventeenth embodiment. The second pressure reducing device 10 is composed of a differential pressure valve for adjusting the degree of opening according to the differential pressure between the high pressure and the low pressure.

Specifically, the second pressure reducing device 10 includes a cylindrical case 10b engaged and fixed in the pipe member 10a of the second refrigerant passage B. In this cylindrical case 10b, the valve body 10c is movably accommodated so that the valve body 10c can be moved in the axial direction of the case (in the traverse direction in FIG. 18A).

Figure 18C:
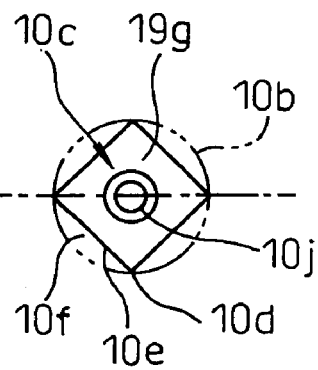
FIG. 18C is a front view of the valve body.

As shown in FIGS. 18B and 18C, the valve body 10c includes a polygonal body (a square body in the example shown in the drawing). The corner portions of this polygonal body are opposed to the inner circumferential face of the cylindrical case 10b via minute gaps. The valve body 10c is moved in the axial direction of the case by the guide action conducted by the corner portions 10d of the polygonal body and the inner circumferential face of the cylindrical case 10b.

The refrigerant passage 10f is composed of a gap portion which is formed between the flat faces 10e, which are located between the corner portions of the polygonal body, and the inner circumferential face of the cylindrical case 10b.

The protruding portion 19g, the shape of which is a circular truncated cone, is formed on an end face of the polygonal body of the valve body 10c at the upstream side (the high pressure side) of the flow of the refrigerant. As shown in FIG. 18A, the valve seat portion 10h is integrally formed in the upstream side portion of the valve body 10c on the inner circumferential face of the cylindrical case 10b. This valve seat portion 10h is a small diameter portion protruding stepwise from the inner circumferential face of the cylindrical case 10b toward the inside.

The inner diameter of this valve seat portion 10h is designed to be smaller than the outer size of the polygonal body of the valve body 10c, and the conical face of the protruding portion 19g comes into contact with the valve seat portion 10h. FIG. 18A is a view showing a state in which the protruding portion 19g of the valve body 10c is in contact with the valve seat portion 10h by a spring force generated by the coil-shaped spring 10i.

In the above state, the refrigerant passage 10f, which is formed between the flat faces 10e of the polygonal body of the valve body 10c and the inner circumferential face of the cylindrical case 10b, is completely closed. Therefore, the high pressure passage 10k at the upstream side and the low pressure passage 10m at the downstream side are communicated with each other only by the throttling passage hole 10j penetrating the center of the valve body 10c.

On the other hand, when a differential pressure ("the high pressure PH"—"the low pressure PL") between the high pressure PH of the high pressure passage 10k and the low pressure PL of the low pressure passage 10m is increased, and when a force caused by this differential pressure overcomes the spring force of the coil-shaped spring 10i, the valve body is moved to the left in FIG. 18A, and the protruding portion 19g of the valve body 10c is separated from the valve seat portion 10h.

Due to the foregoing, the refrigerant passage 10f at the outer circumferential side of the valve body 10c is opened. Accordingly, the high pressure passage 10k and the low pressure passage 10m are communicated with each other by both the throttling passage hole 10j and the refrigerant passage 10f. Therefore, the second pressure reducing device 10 exhibits a function of the differential pressure valve (the variable throttle) in which the degree of the throttle opening is increased by the increase in the differential pressure between the high pressure PH and the low pressure PL.

Figure 19:
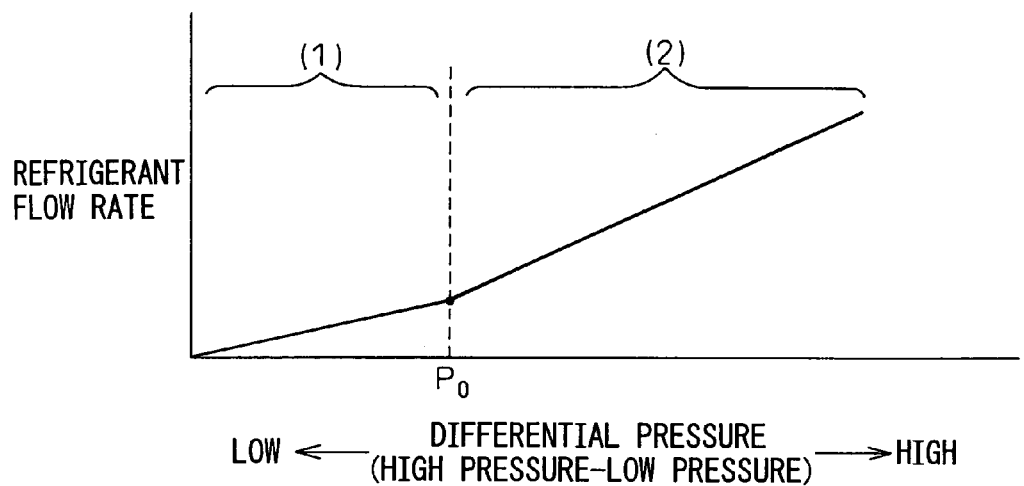
FIG. 19 is a refrigerant flow rate adjusting characteristic chart of the differential pressure regulating valve composing the second pressure reducing device in the seventeenth embodiment.

FIG. 19 is a diagram showing the refrigerant flow rate adjusting characteristic of the second pressure reducing device 10 composed of the differential pressure valve shown in FIG. 18. P0 on the axis of abscissa is a predetermined differential pressure at the time when the protruding portion 19g of the valve body 10c is separated (opened) from the valve seat portion 10h. In the region (1) in which the differential pressure between the high pressure PH and the low pressure PL is lower than this predetermined differential pressure P0, the high pressure passage 10k and the low pressure passage 10m are communicated with each other only by the throttling passage hole 10j. Accordingly, the second pressure reducing device 10 acts as a fixed throttle.

On the other hand, in the region (2) in which the differential pressure between the high pressure PH and the low pressure PL is higher than this predetermined differential pressure P0, the protruding portion 19g of the valve body 10c is separated (opened) from the valve seat portion 10h, and the high pressure passage 10k and the low pressure passage 10m are communicated with each other by both the throttling passage hole 10j and the refrigerant passage 10f. In this case, an opening area of the refrigerant passage 10f is increased according to an increase in the differential pressure. Accordingly, in the region (2), the second pressure reducing device 10 acts as a variable throttle.

In the seventeenth embodiment, the second pressure reducing device 10 is composed of a differential pressure valve (variable throttle). The structure of this differential pressure valve is very simple compared with the structure of an expansion valve which conducts controlling of the degree of superheating of the refrigerant at the outlet of the evaporator. Therefore, this differential pressure valve can be manufactured at a low cost.

The differential pressure between the high pressure PH and the low pressure PL is increased according to the increase in the cooling load, that is, the differential pressure between the high pressure PH and the low pressure PL is correlated to the increase in the cooling load. Therefore, according to the increase in the cooling load, a flow rate of the refrigerant to the second evaporator 11 can be increased.

More important things are described as follows. The differential pressure valve composing the second pressure reducing device 10 is a variable throttle, the degree of valve opening of which is decreased when the high pressure PH is lowered. Therefore, even when the second pressure reducing device 10 is composed of a variable throttle, the high pressure controlling function conducted by the first pressure reducing valve is not affected.

Figure 24:
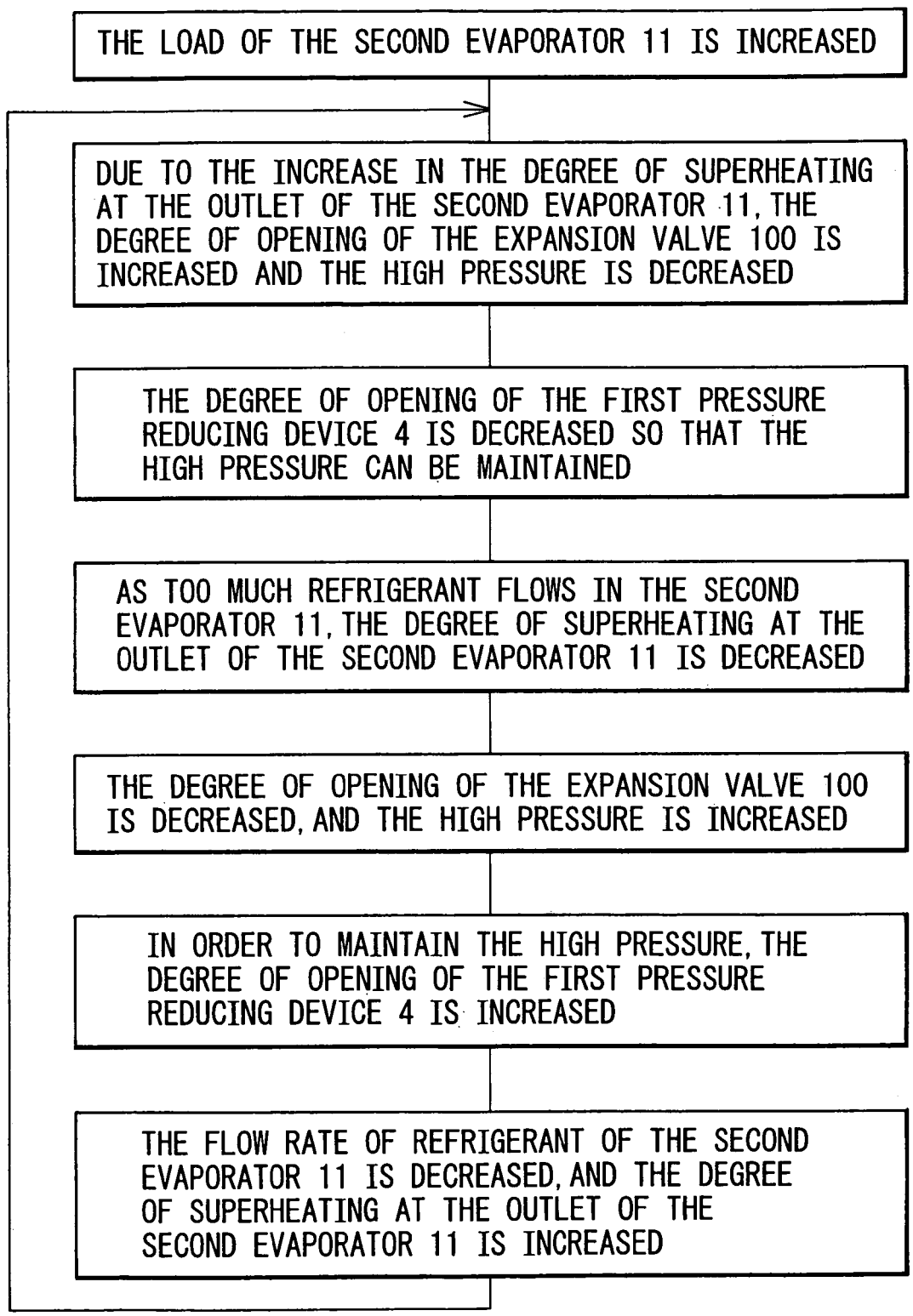
FIG. 24 is a schematic illustration for explaining a behavior of the cycle in the prior art shown in FIG. 22.

That is, when the second pressure reducing device 10 is a temperature-type expansion valve which conducts control of the degree of superheating, when a cooling load of the second evaporator 11 is increased, the cycle behavior shown in FIG. 24 is caused and the high pressure control conducted by the first pressure reducing device 4 becomes unstable and hunting is caused. However, when the high pressure PH is lowered, the differential pressure valve composing the second pressure reducing device 10 is changed so that the degree of valve opening can be reduced. Accordingly, when the high pressure PH is lowered, the differential pressure valve is operated so that a decrease in the high pressure PH can be suppressed. On the contrary, when the high pressure PH is raised, the degree of valve opening of the differential pressure valve composing the second pressure reducing device 10 is increased. Accordingly, the differential pressure valve acts so that an increase in the high pressure PH can be suppressed.

As a result, even when the second pressure reducing valve 10 is composed of the pressure differential valve (the variable throttle), the high pressure controlling function conducted by the first pressure reducing valve 4 is not affected.

In this connection, in the seventeenth embodiment, the pressure differential valve is used as the variable throttle composing the second pressure reducing valve 10. However, as the variable throttle composing the second pressure reducing valve 10, it is possible to use a high-pressure responding valve, the degree of valve opening of which is changed according to the high pressure PH, or a high pressure refrigerant temperature responding valve, the degree of valve opening of which is changed according to the high pressure refrigerant temperature. The high-pressure responding valve and the high pressure refrigerant temperature responding valve are variable throttle, the degree of valve opening of which is changed so that it can be decreased when the high pressure PH is lowered. Therefore, these valves exhibit the same effect as that of the differential pressure valve.

In the case where the first pressure reducing device 4 is composed of a fixed throttle, for example, the first pressure reducing device 4 of the fifth embodiment (shown in FIG. 6) may not be composed of a fixed throttle but be composed of a variable throttle such as a differential pressure valve explained in the seventeenth embodiment.

Different from the first pressure reducing device 4 in the third embodiment (shown in FIG. 4), the fourth embodiment (shown in FIG. 5) and the ninth embodiment (shown in FIG. 10), the pressure reducing device for reducing the pressure of the refrigerant introduced into both the evaporators 5, 11 may not be composed of a fixed throttle but may be composed of a variable throttle such as a differential pressure valve explained in the seventeenth embodiment.

Figure 20:
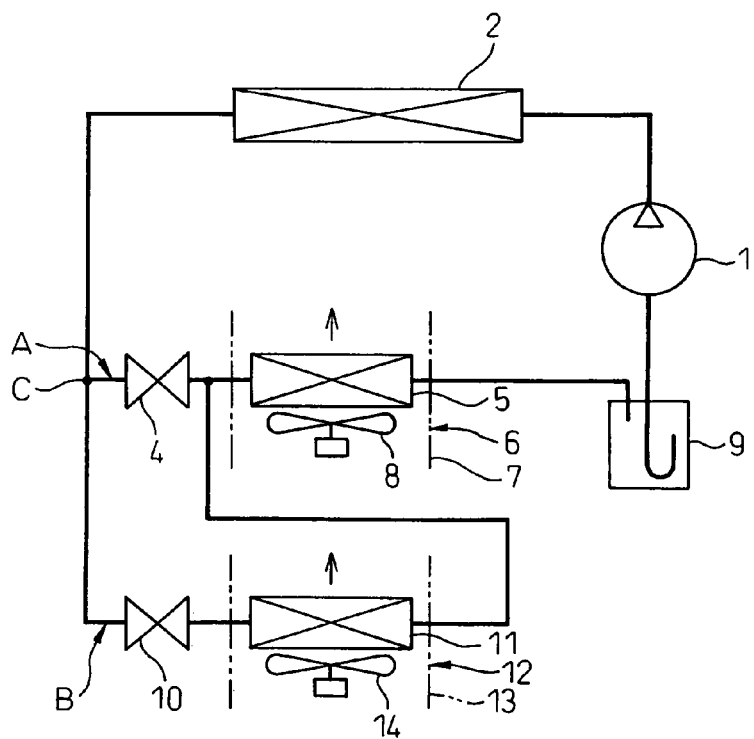
FIG. 20 is an arrangement view showing a refrigerating cycle of the eighteenth embodiment of the present invention.

Next, the eighteenth embodiment will be explained below. In the seventh embodiment shown in FIG. 8, the first pressure reducing device 4 is composed of a high pressure controlling type pressure reducing device. However, in the eighteenth embodiment shown in FIG. 20, the first pressure reducing device 4 is composed of a variable throttle such as a differential pressure valve explained in the seventeenth embodiment referring to FIG. 18, that is, the first pressure reducing device 4 is composed of a variable throttle valve, the degree of valve opening of which is decreased when the high pressure PH is lowered. The second pressure reducing device 10 is composed of a fixed throttle.

In this connection, in the eighteenth embodiment, both the first pressure reducing device 4 and the second pressure reducing device 10 may be respectively composed of a variable throttle such as a differential pressure valve. Both the first pressure reducing device 4 and the second pressure reducing device 10 may be respectively composed of a fixed throttle.

Figure 21:
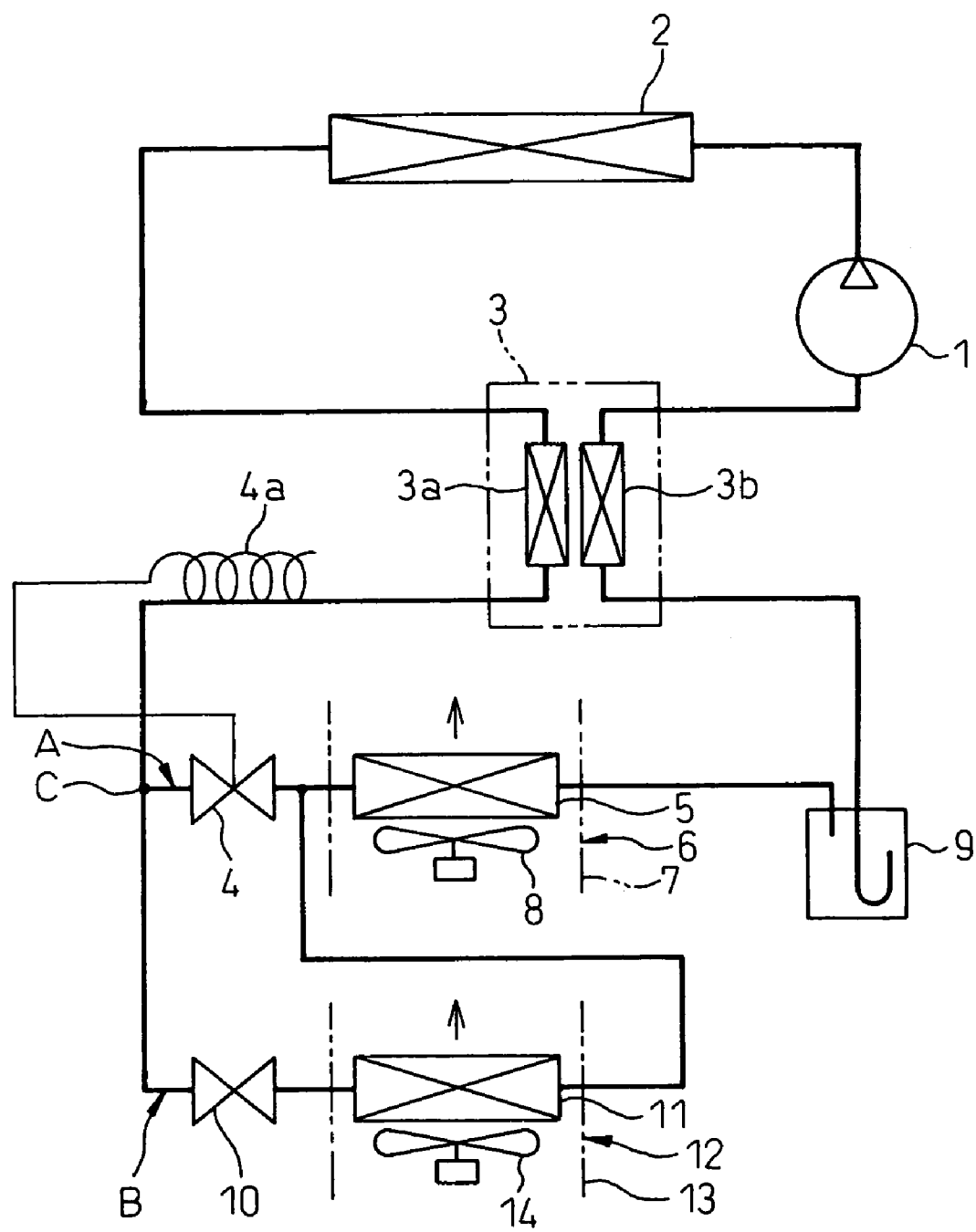
FIG. 21 is an arrangement view showing a refrigerating cycle of the nineteenth embodiment of the present invention.
Figure 22:
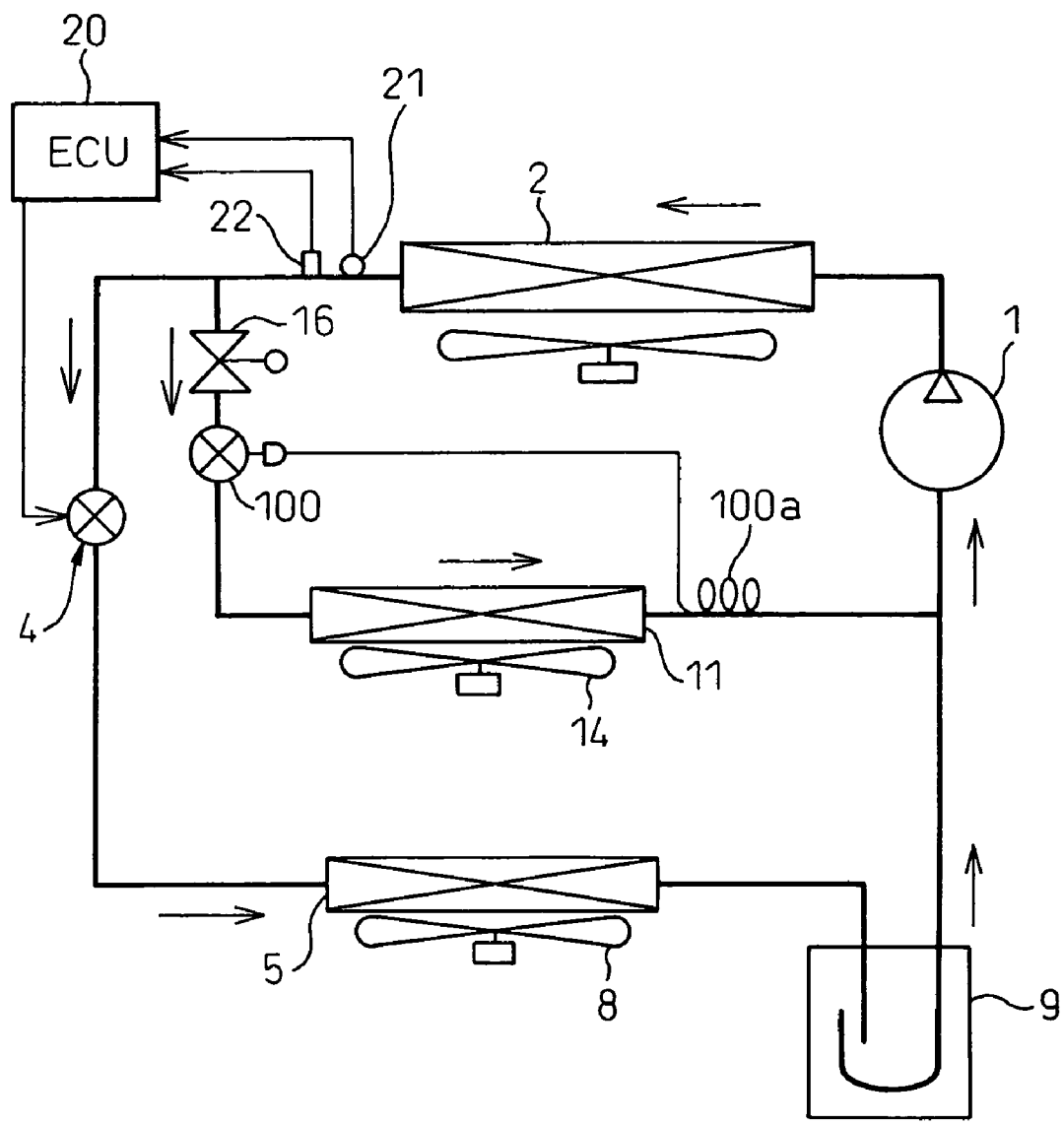
FIG. 22 is an arrangement view showing a refrigerating cycle of the prior art.
Figure 23:
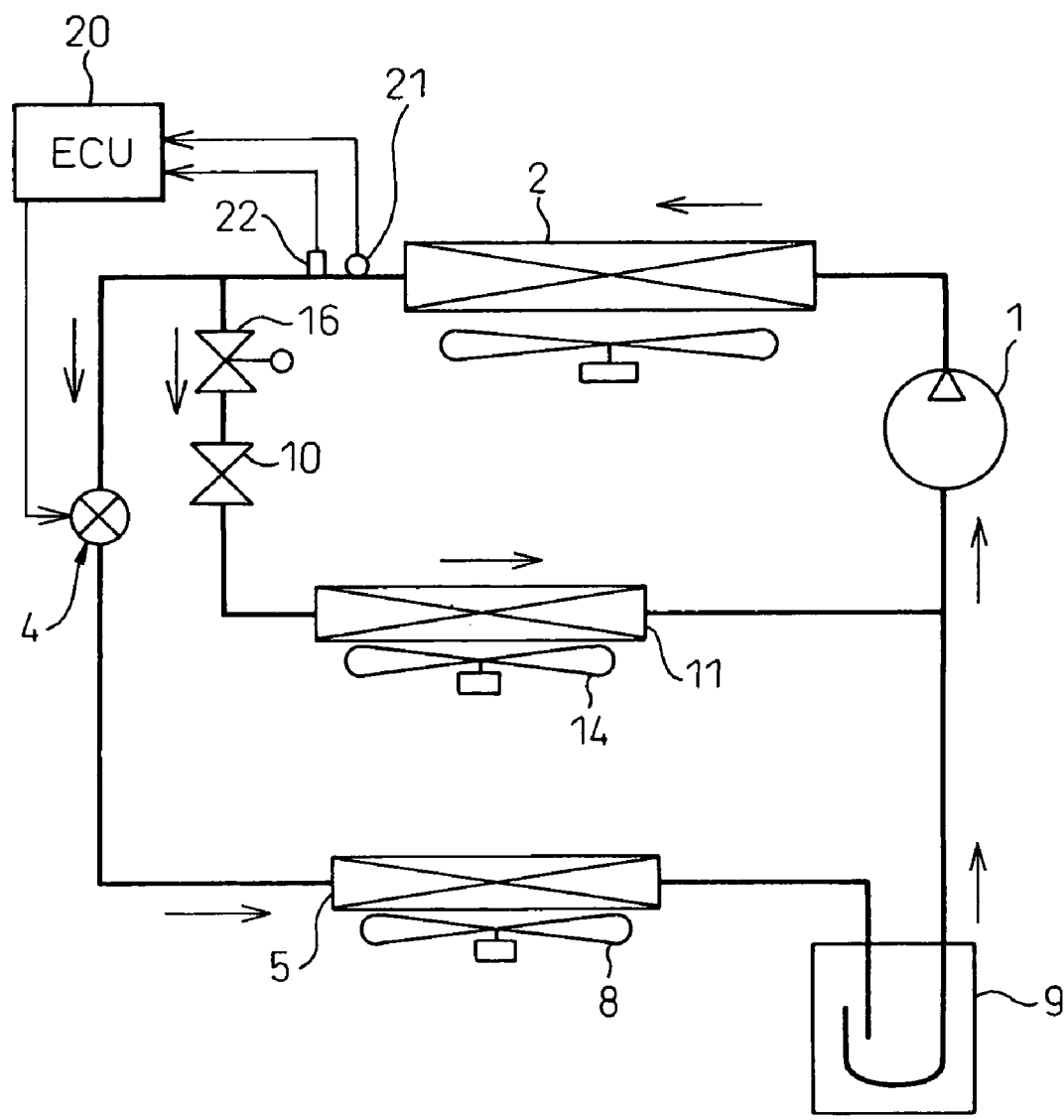
FIG. 23 is an arrangement view showing a refrigerating cycle of another example of the prior art.

Next, the nineteenth embodiment will be explained below. In the tenth embodiment shown in FIG. 11, the first pressure reducing device 4 is composed of a high pressure controlling type pressure reducing device, and its temperature sensing portion 4a is arranged between the outlet side of the radiator 2 and the inlet side of the high pressure side refrigerant passage 3a of the internal heat exchanger 3. However, in the nineteenth embodiment shown in FIG. 21, the temperature sensing portion 4a of the first pressure reducing device 4 is arranged on the outlet side of the high pressure side refrigerant passage 3a of the internal heat exchanger 3 in the same manner as that of the fifteenth embodiment shown in FIG. 16.

In the nineteenth embodiment, the second pressure reducing device 10 is composed of a fixed throttle or a variable throttle such as a differential pressure valve explained in the seventeenth embodiment referring to FIG. 18.

Finally, another embodiment will be explained below. In this connection, in each embodiment described above, evaporator 5, of the two evaporators 5, 11 which are connected in parallel with each other, is used for air conditioning at the front seat side in the vehicle passenger compartment, and evaporator 11 is used for air conditioning at the rear seat side in the vehicle passenger compartment. However, for example, evaporator 5 may be used for air conditioning in the vehicle passenger compartment, and the evaporator 11 may be used for cooling a refrigerator mounted in the vehicle passenger compartment.

The refrigerant in the supercritical cycle is not limited to $CO_2$. For example, ethylene, ethane or nitrogen oxide may be used for the refrigerant in the supercritical cycle.

The present invention may be applied to a normal refrigerating cycle (subcritical cycle), the high pressure of which does not exceed the critical pressure.

While the invention has been described by reference to specific embodiments chosen for purposes of illustration, it should be apparent that numerous modifications could be made thereto, by those skilled in the art without departing from the basic concept and scope of the invention.

The invention claimed is:

1. A refrigerating cycle comprising:
   a compressor (1) for sucking and compressing a refrigerant;
   a radiator (2) for cooling the refrigerant discharged from the compressor (1);
   at least one pressure reducing means (4, 10) for reducing pressure of the refrigerant at the outlet side of the radiator (2);
   a plurality of evaporators (5, 11) for evaporating the low pressure refrigerant which has passed through the pressure reducing means (4, 10);
   an accumulator (9) provided on the outlet side of one evaporator (5) in the plurality of evaporators (5, 11); and
   an internal heat exchanger (3) for exchanging heat between the low pressure refrigerant, which flows between the outlet side of the accumulator (9) and the suction side of the compressor (1), and the high pressure refrigerant at the outlet side of the radiator (2), wherein
   the outlet side of the other evaporator (11) in the plurality of evaporators (5, 11) is joined to a portion between the outlet side of the accumulator (9) and the inlet side of the internal heat exchanger (3), and at least one pressure reducing means reduces the pressure of the refrigerant, which is supplied at least to the other evaporator (11), by a fixed throttle (4, 10).

2. A refrigerating cycle according to claim 1, wherein only one fixed throttle is provided, and pressure of the refrigerant supplied to the plurality of evaporators (5, 11) is reduced by the one fixed throttle.

3. A refrigerating cycle according to claim 1, the at least one pressure reducing means including: a pressure reducing means (4), for reducing the pressure of the refrigerant supplied to one evaporator (5); and a fixed throttle (10), for reducing the pressure of the refrigerant supplied to the other evaporator (11), wherein the pressure reducing means (4) and the fixed throttle (10) are provided independently of each other.

4. A refrigerating cycle comprising:
a compressor (1) for sucking and compressing a refrigerant;
a radiator (2) for cooling the refrigerant discharged from the compressor (1);
at least one pressure reducing means (4, 10) for reducing pressure of the refrigerant at the outlet side of the radiator (2);
a plurality of evaporators (5, 11) for evaporating the low pressure refrigerant which has passed through the pressure reducing means (4, 10);
an accumulator (9) provided on the outlet side of one evaporator (5) in the plurality of evaporators (5, 11); and
an internal heat exchanger (3) for exchanging heat between the low pressure refrigerant, which flows between the outlet side of the accumulator (9) and the suction side of the compressor (1), and the high pressure refrigerant at the outlet side of the radiator (2), wherein
the outlet side of the other evaporator (11) in the plurality of evaporators (5, 11) is joined to a portion between the outlet side of the accumulator (9) and the inlet side of the internal heat exchanger (3),
at least one pressure reducing means reduces the pressure of the refrigerant, which is supplied at least to the other evaporator (11), by a variable throttle (10), and
the variable throttle (10) is changed so that the degree of opening can be reduced when the high pressure is lowered.

5. A refrigerating cycle according to claim 4, wherein the variable throttle (10) is one of a differential pressure valve, the degree of opening of which is changed according to the differential pressure between the high pressure and the low pressure, a high-pressure responding valve, the degree of valve opening of which is changed according to the high pressure, and a high pressure refrigerant temperature responding valve, the degree of valve opening of which is changed according to the high pressure refrigerant temperature.

6. A refrigerating cycle according to claim 4, at least one pressure reducing means including: a pressure reducing means (4) for reducing the pressure of the refrigerant supplied to one evaporator (5); and a variable throttle (10) for reducing pressure of the refrigerant supplied to the other evaporator (11), wherein the pressure reducing means (4) and the variable throttle (10) are provided independently of each other.

7. A refrigerating cycle according to claim 3, wherein the pressure reducing means (4) at one evaporator (5) side controls the high pressure according to the high pressure refrigerant temperature at the outlet side of the radiator (2).

8. A refrigerating cycle comprising:
a compressor (1) for sucking and compressing a refrigerant;
a radiator (2) for cooling the refrigerant discharged from the compressor (1);
one pressure reducing means (4, 10) for reducing pressure of the refrigerant at the outlet side of the radiator (2);
a plurality of evaporators (5, 11) for evaporating the low pressure refrigerant which has passed through the pressure reducing means (4, 10);
an accumulator (9) provided on the outlet side of one evaporator (5) in the plurality of evaporators (5, 11); and
an internal heat exchanger (3) for exchanging heat between the low pressure refrigerant, which flows between the outlet side of the accumulator (9) and the suction side of the compressor (1), and the high pressure refrigerant at the outlet side of the radiator (2), wherein
the outlet side of the other evaporator (11) in the plurality of evaporators (5, 11) is joined to a portion between the outlet side of the accumulator (9) and the inlet side of the internal heat exchanger (3), and
one pressure reducing means controls the high pressure according to the high pressure refrigerant temperature at the outlet side of the radiator (2).

9. A refrigerating cycle comprising:
a compressor (1) for sucking and compressing a refrigerant;
a radiator (2) for cooling the refrigerant discharged from the compressor (1);
at least one pressure reducing means (4, 10) for reducing the pressure of the refrigerant at the outlet side of the radiator (2);
a plurality of evaporators (5, 11) for evaporating the low pressure refrigerant which has passed through the pressure reducing means (4, 10);
an accumulator (9) provided between the outlet side of the plurality of evaporators (5, 11) and the suction side of the compressor (1), and
a refrigerant passage through which the refrigerant flowing out from at least one of the plurality of evaporators (5, 11) is introduced onto the inlet side of the other evaporator.

10. A refrigerating cycle according to claim 9, wherein the pressure reducing means is composed of one pressure reducing means (4) for reducing the pressure of the refrigerant flowing into the plurality of evaporators (5, 11).

11. A refrigerating cycle according to claim 9, wherein a plurality of pressure reducing means (4, 10) are provided corresponding to the plurality of evaporators (5, 11).

12. A refrigerating cycle according to claim 11, wherein one pressure reducing means (4) in the plurality of pressure reducing means controls the high pressure according to the high pressure refrigerant temperature at the outlet side of the radiator (2).

13. A refrigerating cycle according to claim 12, wherein the other pressure reducing means (10), which is one of the plurality of pressure reducing means is composed of a fixed throttle.

14. A refrigerating cycle according to claim 12, wherein the other pressure reducing means in the plurality of pressure reducing means is composed of a variable throttle (10), and the degree of opening of the variable throttle (10) is reduced when the high pressure is lowered.

15. A refrigerating cycle according to claim 11, wherein at least one of the plurality of pressure reducing means (4, 10) is composed of a fixed throttle (10).

16. A refrigerating cycle according to claim 11, wherein at least one of the plurality of pressure reducing means (4, 10) is composed of a variable throttle (10), and the degree of opening of the variable throttle is reduced when the high pressure is lowered.

17. A refrigerating cycle according to claim 14, wherein the variable throttle (10) is one of a differential pressure valve, the degree of opening of which is changed according to the differential pressure between the high pressure and the low pressure, a high-pressure responding valve, the degree of valve opening of which is changed according to the high pressure, and a high pressure refrigerant temperature responding valve, the degree of valve opening of which is changed according to the high pressure refrigerant temperature.

18. A refrigerating cycle according to claim 9, further comprising an internal heat exchanger (3) for exchanging heat between the low pressure refrigerant, which flows between the outlet side of the accumulator (9) and the suction side of the compressor (1), and the high pressure refrigerant at the outlet side of the radiator (2).

19. A refrigerating cycle according to claim 1, further comprising an opening and closing valve (16) for stopping a flow of the refrigerant to at least one evaporator in the plurality of evaporators (5, 11).

20. A refrigerating cycle according to claim 1, further comprising a changeover valve (17) for changing over a flow of the refrigerant to the plurality of evaporators (5, 11).

21. A refrigerating cycle according to claim 1, wherein the refrigerating cycle is a supercritical refrigerating cycle using a refrigerant, the pressure of which is not less than the critical pressure.

22. An air conditioner for vehicle use comprising the refrigerating cycle described in claim 1, wherein one evaporator (5) in the plurality of evaporators (5, 11) is arranged in the air conditioning unit (6) at the front seat side in the vehicle passenger compartment, and the other evaporator (11) in the plurality of evaporators (5, 11) is arranged in the air conditioning unit (12) at the rear seat side in the vehicle passenger compartment.

* * * * *